United States Patent
Takahashi

(10) Patent No.: US 8,384,327 B2
(45) Date of Patent: Feb. 26, 2013

(54) CONTROL APPARATUS FOR ELECTRIC ROTATING MACHINE

(75) Inventor: Tomoya Takahashi, Anjo (JP)

(73) Assignee: Denso Corporation, Kariya (JP)

(*) Notice: Subject to any disclaimer, the term of this patent is extended or adjusted under 35 U.S.C. 154(b) by 470 days.

(21) Appl. No.: 12/830,751

(22) Filed: Jul. 6, 2010

(65) Prior Publication Data

US 2011/0031910 A1    Feb. 10, 2011

(30) Foreign Application Priority Data

Aug. 5, 2009   (JP) ................................. 2009-182424

(51) Int. Cl.
*H02P 27/00*   (2006.01)
(52) U.S. Cl. ............ 318/400.3; 318/400.26; 318/400.29
(58) Field of Classification Search ............... 318/400.3, 318/400.29, 293, 400.27, 400.28, 492, 599, 318/400.26
See application file for complete search history.

(56) References Cited

U.S. PATENT DOCUMENTS

| | | | |
|---|---|---|---|
| 7,023,168 | B1 | 4/2006 | Patel et al. |
| 7,535,210 | B2 * | 5/2009 | Wang ........................... 323/282 |
| 2002/0113570 | A1 | 8/2002 | Heikkila |
| 2010/0219780 | A1 | 9/2010 | Morimoto et al. |

FOREIGN PATENT DOCUMENTS

| | | |
|---|---|---|
| JP | A-09-149700 | 6/1997 |
| JP | A-10-210799 | 8/1998 |
| JP | A-2000-278982 | 10/2000 |
| JP | A-2002-209398 | 7/2002 |
| JP | A-2007-259607 | 10/2007 |
| JP | A-2008-228419 | 9/2008 |
| JP | A-2009-124811 | 6/2009 |
| WO | WO 2009/063786 A1 | 5/2009 |

OTHER PUBLICATIONS

Office Action issued in Japanese Application No. 2009-182424 dated May 31, 2011 (w/ English Translation).

* cited by examiner

*Primary Examiner* — Karen Masih
(74) *Attorney, Agent, or Firm* — Oliff & Berridge, PLC

(57) ABSTRACT

The control apparatus controls a controlled variable of the electric rotating machine by manipulating an output voltage of a power converter circuit including switching elements operated at a set modulation index to connect positive and negative terminals of a DC power source to corresponding terminals of the electric rotating machine. The control apparatus includes a prediction section configured to predict the controlled variable for each of a plurality of cases where the power converter circuit is set in a corresponding one of a plurality of predetermined operating states, a manipulation section configured to determine one of the predetermined operating states depending on a result of evaluation by an evaluation function, and set the converter circuit to the determined operating state, and a feedback control section configured to feedback-control the output voltage of the power converter circuit at a target value by manipulating the input parameters of the evaluation function.

20 Claims, 24 Drawing Sheets

| VOLTAGE VECTOR | SWITCHING ELEMENTS WHICH ARE ON | | |
|---|---|---|---|
| | U-PHASE | V-PHASE | W-PHASE |
| V0 | LOW SIDE | LOW SIDE | LOW SIDE |
| V1 | HIGH SIDE | LOW SIDE | LOW SIDE |
| V2 | HIGH SIDE | HIGH SIDE | LOW SIDE |
| V3 | LOW SIDE | HIGH SIDE | LOW SIDE |
| V4 | LOW SIDE | HIGH SIDE | HIGH SIDE |
| V5 | LOW SIDE | LOW SIDE | HIGH SIDE |
| V6 | HIGH SIDE | LOW SIDE | HIGH SIDE |
| V7 | HIGH SIDE | HIGH SIDE | HIGH SIDE |

US 8,384,327 B2

CONTROL APPARATUS FOR ELECTRIC ROTATING MACHINE

This application claims priority to Japanese Patent Application No. 2009-182424 filed on Aug. 5, 2009, the entire contents of which are hereby incorporated by reference.

BACKGROUND OF THE INVENTION

1. Field of the Invention

The present invention relates to a control apparatus for an electric rotating machine, the control apparatus being configured to control the controlled variables of the electric rotating machine by adjusting the output voltage of a power converter circuit including switching elements which are operated to connect positive and negative terminals of a DC power source to corresponding terminals of the electric rotating machine.

2. Description of Related Art

Such control apparatuses include the one which performs triangular wave comparison PWM control in which, in order to feedback-control the currents flowing through the respective phases of a three-phase motor at their command values, command voltages of the respective phases are calculated, and switching elements of an inverter are operated in accordance with comparison results between each of the calculated command values and a triangular wave carrier signal.

Further, in recent years, there is proposed the one which performs the so-called model predictive control in which the currents flowing through the respective phases of a three-phase motor are predicted for each of different operating states of an inverter, and the inverter is operated in one of the operating states in which the deviation between each predicted current and a command current is minimum. For example, refer to Japanese Patent Application Laid-Open No. 2008-228419 (Patent document 1). According to the above apparatus, since the inverter is operated such that the behavior of the currents predicted on the basis of the output voltage of the inverter is optimized, the followability to the command current during a transient period can be improved compared to the apparatus which performs the triangular wave comparison PWM control. Accordingly, the model predictive control is expected to be useful for a control apparatus which is required to exhibit high followability during a transient period, for example, when it is used for a motor-generator which is mounted on a vehicle as a main engine of the vehicle.

Incidentally, such a control apparatus which performs the model predictive control is described also in Japanese Patent No. 3727268 (Patent document 2).

However, in the control apparatus which performs the model predictive control, although the output current of an inverter can be controlled at a command current within the range in which the modulation index is smaller than 1, that is, an average amplitude between output lines of the power converter circuit is smaller than the voltage of the DC power source, it is difficult to control the output current at the command value in the overmodulation range in which the modulation index exceeds 1 due to the constraint depending on the input voltage of the inverter.

SUMMARY OF THE INVENTION

The present invention provides a control apparatus for an electric rotating machine to control at least one controlled variable of the electric rotating machine by manipulating an output voltage of a power converter circuit including switching elements operated at a set modulation index to connect positive and negative terminals of a DC power source to corresponding terminals of the electric rotating machine, the control apparatus comprising:

a prediction section configured to predict the controlled variable of the electric rotating machine for each of a plurality of cases where the power converter circuit is set in a corresponding one of a plurality of predetermined operating states;

a manipulation section configured to determine one of the predetermined operating states depending on a result of evaluation by an evaluation function which receives the predicted controlled variable and a command value of the controlled variable as input parameters thereof, and to set the converter circuit to the determined operating state; and a feedback control section configured to feedback-control an average value of magnitude of the output voltage of the power converter circuit at a target value set in accordance with a voltage of the DC power source by manipulating the input parameters of the evaluation function depending on the average value of magnitude of the output voltage of the power converter circuit.

According to the present invention, there is provided a control apparatus for an electric rotating machine capable of appropriately performing the model predictive control even in the overmodulation range.

Other advantages and features of the invention will become apparent from the following description including the drawings and claims.

PREFERRED EMBODIMENTS OF THE INVENTION

First Embodiment

Figure 1:
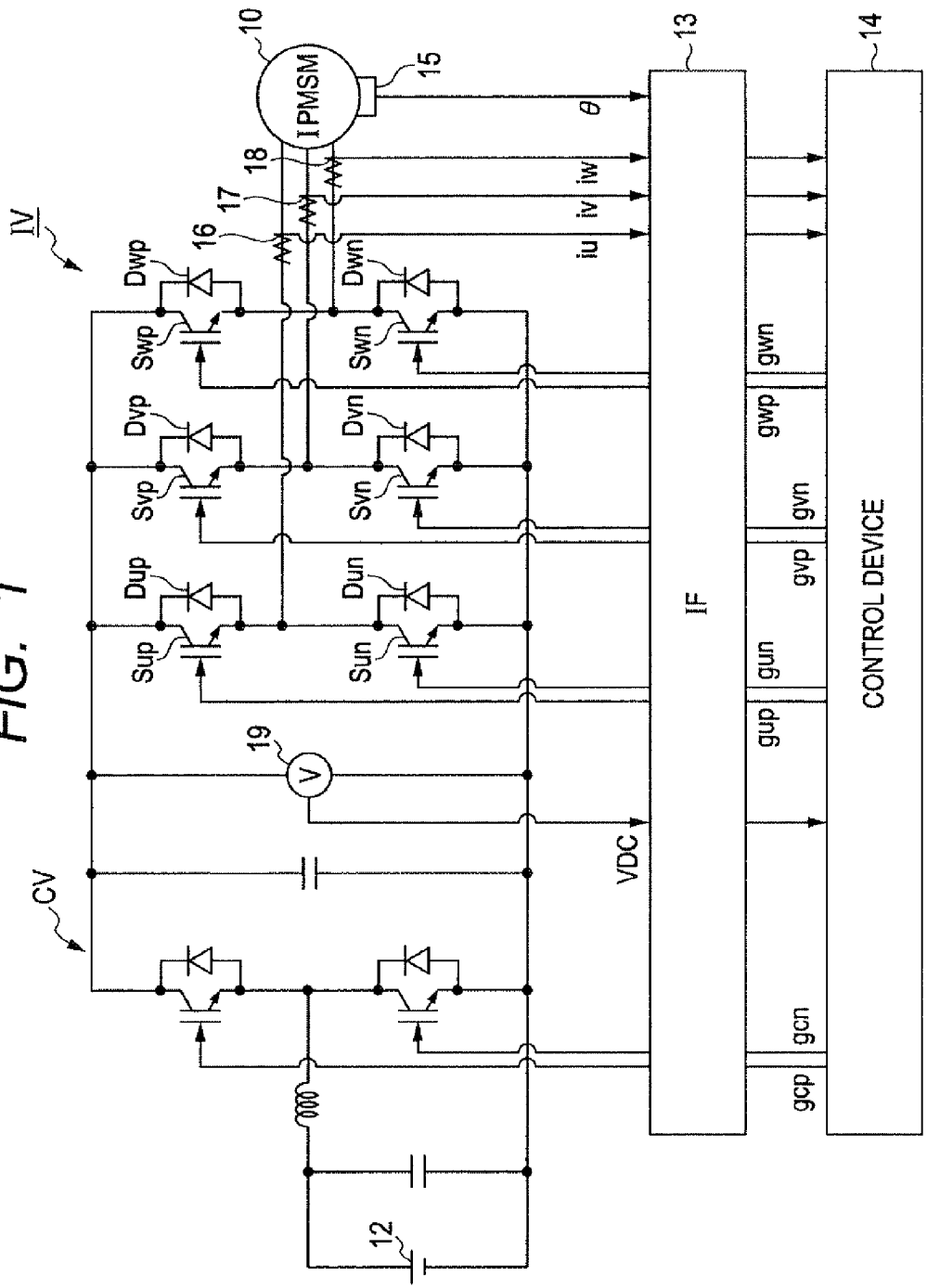
FIG. 1 is a diagram showing the structure of a control system for an electric rotating machine including a control apparatus according to a first embodiment of the invention.

FIG. 1 is a diagram showing the overall structure of a control system for a motor-generator 10 mounted on a hybrid vehicle, the system including a control apparatus according to a first embodiment of the invention. The motor-generator 10 is a salient-pole type electric rotating machine which operates as a three-phase permanent magnet synchronous motor. That is, the motor-generator 10 is an IPMSM (Interior Permanent magnet Synchronous Motor).

The motor-generator 10 is connected to a high voltage battery 12 through an inverter IV and a step-up converter CV. The step-up converter CV steps up the output voltage of the high-voltage battery 12 (288 V, for example) up to a predetermined voltage (666 V, for example). The inverter IV is constituted of a series connection of switching elements Sup and Sun, a series connection of switching elements Svp and Svn, and a series connection of switching elements Swp and Swn, these series connections being connected to the U, V and W phases of the motor-generator 10, respectively. In this embodiment, as these switching elements Sup, Sun, Svp, Svn, Swp and Swn, IGBTs (Insulated Gate Bipolar Transistors) are used. These switching elements Sup, Sun, Svp, Svn, Swp and Swn are anti-parallel connected with diodes Dup, Dun, Dvp, Dvn, Dwp and Dwn, respectively.

As means for detecting the operating states of the motor-generator 10 and the inverter IV, this embodiment includes a rotation angle sensor 15 to detect the rotational angle (electric angle θ) of the motor-generator 10, current sensors 16, 17 and 18 to measure the phase currents iu, iv and iw flowing through the respective phases of the motor-generator 10, and a voltage sensor 19 to measure the input voltage of the inverter IV (power supply voltage VDC).

The sensor signals from these sensors are inputted to a control device 14 constituting a low-voltage system through an interface 13. The control device 14 generates operation signals to operate the inverter IV and the converter CV in accordance with the sensor signals. In more detail, the control device 14 generates operation signals gup, gun, gvp, gvn, gwp and gwn to control the switching elements Sup, Sun, Svp, Svn, Swp and Swn, respectively, and generates operation signals gcp and gcn to control the two switching elements of the step-up converter CV.

The control device 14 operates the inverter IV in order to control the controlled variables of the motor-generator 10 at command values. This embodiment performs model predictive control in which each controlled variable of the motor-generator 10 is predicted for each of different operating states of the inverter IV, and the inverter IV is operated in one of the operating states in which the predicted controlled variable is closest to the corresponding command value. Next, explanation is given of the operating states of the inverter IV.

Figures 2A, 2B:
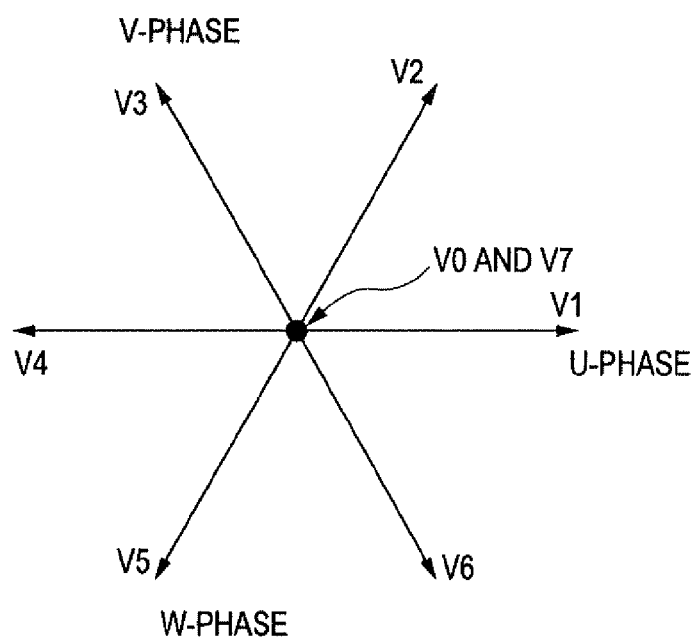
FIGS. 2A and 2B are diagrams showing an operating state of an inverter included in the control system of the first embodiment.

The operating state of the inverter IV can be represented by eight voltage vectors V0 to V7 shown in FIG. 2A. For example, the voltage vector V0 represents the state in which the switching elements Sun, Svn and Swn on the low voltage side (indicated by "low side" in FIG. 2A) are on, and the voltage vector V7 represents the state in which the switching elements Sup, Svp and Swp on the high voltage side (indicated by "high side" in FIG. 2A) are on. Each of the voltage vectors V0 and V7 is a voltage vector for short-circuiting all of the respective phases of the motor-generator 10, causing the voltage applied to the motor-generator 10 to be 0. Accordingly, they are called "zero vector". The other six voltage vectors V1 to V6 define different states in each of which at least one of the switching elements on the upper-arm side (high voltage side) and at least one of the switching elements on the lower-arm side (low voltage side) are on. Accordingly, they are called "non-zero vector". As shown in FIG. 2B, the voltage vectors V1, V3 and V5 represent the states in each of which the switching element on the high voltage side of one of the U, V or W phase is on.

In this embodiment, the controlled variables of the motor-generator 10 are predicted for each of the eight operating states (voltage vectors V0 to V7) of the inverter IV, and one of the voltage vectors is selected according to which the operating state of the inverter IV should be set in accordance with the prediction results.

Figure 3:
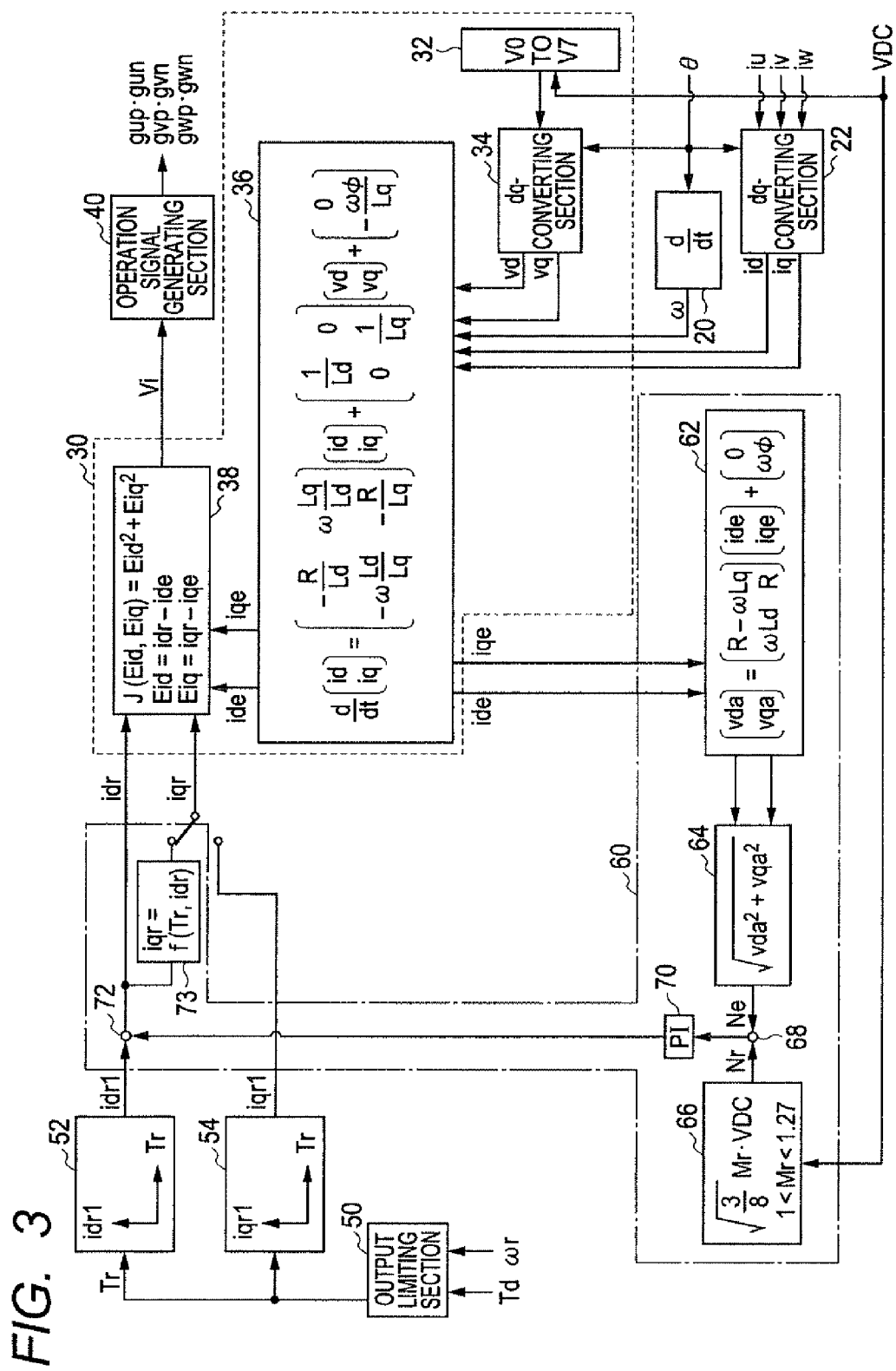
FIG. 3 is a functional block diagram explaining the operation of the control apparatus of the first embodiment.

FIG. 3 is a functional block diagram explaining the process of the model predictive control performed in this embodiment.

A velocity calculating section 20 calculates the electrical angular velocity ω on the basis of the electric angle θ of the motor-generator 10 measured by the rotation angle sensor 15. A dq converting section 22 converts the phase currents measured by the current sensors 16, 17 and 18 into currents on the dq-axes as actual currents id and iq.

The electrical angular velocity ω and the currents id and iq are inputted to a model predictive control section 30. An operating state setting section 32 sets the operating state of the inverter IV by use of the voltage vector V0 to V7. A dq converting section 34 dq-converts the voltage vector set by the operating state setting section 32 to calculate the voltage vector (vd, vq) in the dq coordinate system. To perform the above conversion, each of the voltage vectors V0 to V7 shown in FIG. 2A may be represented such that the "high side" takes a value of VDC/2, and the "low side" takes a value of −VDC/2. In this case, the voltage vector 0 is represented by (−VDC/2, −VDC/2, −VDC/2), and the voltage vector 1 is represented by (VDC/2, −VDC/2, −VDC/2), for example.

A predicting section 36 predicts the currents id and iq when the inverter IV is brought to the operating state set by the operating state setting section 32 on the basis of the voltage vector (vd, vq), actual currents id and iq, and electrical angular velocity $\omega$. Here, the following voltage equations (c1) and (c2) are solved with respect to the derivative terms of the currents to obtain the following state equations (c3) and (c4), and the currents one step ahead are predicted by discretizing the obtained state equations (c3) and (c4).

$$vd=(R+pLd)id-\omega Lqiq \quad (c1)$$

$$Vq=\omega Ldid+(R+pLq)iq+\omega\phi \quad (c2)$$

$$pid=-(R/Ld)id+\omega(Lq/Ld)iq+vd/Ld \quad (c3)$$

$$piq=-\omega(Ld/Lq)id-(Rd/Lq)iq+vq/Lq-\omega\phi/Lq \quad (c4)$$

In the equations (c1) and (c2), R denotes the resistance, p denotes the differential operator, Ld denotes the d-axis inductance, Lq denotes the q-axis inductance, and $\phi$ denotes the flux linkage constant.

The prediction of the currents is performed for each of the operating states set by the operating state setting section 32.

An operating state determining section 38 determines the operating state of the inverter IV from the predicted currents ide and iqe predicted by the predicting section 36, and the command currents idr and iqr inputted thereto. Here, each of the operating states set by the operating state setting section 32 is evaluated by use of an evaluation function J, and the operating state having the highest evaluation is selected. In this embodiment, as the evaluation function J, there is adopted such a function that its absolute value is larger when the evaluation is lower. In this embodiment, the evaluation function J is the inner product between the command current vector Idqr (idr, iqr) and the predicted current vector Idqe (ide, iqe). Since the variation in each component between the command current vector Idqr and the predicted current vector Idqe takes a positive or negative value, the evaluation function J shows that the evaluation is lower when the variation in each component between the command current vector Idqr and the predicted current vector Idqe is larger.

The thus determined operating state of the inverter IV (the voltage vector Vi) is outputted to an operation signal generating section 40. The operation signal generating section 40 generates the operation signals to bring the inverter IV to the determined operating state indicated by the voltage vector Vi. The above command currents idr and iqr are set to enable maximum torque per ampere control in which a maximum torque is generated by a minimum current.

An output limiting section 50 receives demand torque Td required of the motor-generator 10 set in accordance with torque demand from the vehicle and an electrical angular velocity command value $\omega r$, and calculates torque command value Tr such that the output power of the motor-generator 10 does not exceed a predetermined allowable maximum output. The torque command value Tr coincides with the demand torque Td when the product of the demand torque Td and the electrical angular velocity command value $\omega r$ does not exceed the allowable maximum output.

A command current setting section 52 sets the command current idr1 to implement the torque command value Tr and the maximum torque per ampere control. Another command current setting section 54 sets the command current iqr1 to actualize the command torque Tr and the maximum torque per ampere control. The command currents idr1 and iqr1 thus set are used as input parameters of the evaluation function J when the maximum torque per ampere control is performed. When the maximum torque per ampere control is not performed, a field weakening control section 60 performs field weakening control. In this embodiment, the field weakening control is a feedback control to keep the average value of magnitude of the output voltage of the inverter IV at a target value. Although the average value of magnitude of the output voltage of the inverter IV periodically changes in polarity, it can be quantified with respect to its amplitude by use of an appropriate quantifying method. In this embodiment, as the method, modulation index M is used. Here, the modulation index M is the Fourier coefficient of the fundamental wave component of the output voltage of the inverter IV. The fundamental wave component here is a sine wave having the frequency of $2\pi/\omega$, $\omega$ being the electrical angular velocity of the motor-generator 10. In this embodiment, to calculate the Fourier coefficient, the amplitude center of the fundamental wave and the variation center of the output voltage of the inverter IV are brought in line.

In more detail, the average value of magnitude of the output voltage is quantified as an output voltage vector norm on the dq-axes having a value proportional to the above modulation index. That is, an average voltage calculating section 62 receives the predicted currents ide and iqe from the predicting section 36, and calculates an average value vda of the voltage component on the d-axis, and an average value vqa of the voltage component on the q-axis. These average values can be calculated in accordance with the following model equations (c5) and (c6) which can be obtained by removing the differential operator terms from the model shown by the foregoing equations (c1) and (c2).

$$vda=R\cdot ide-\omega Lq\cdot iqe \quad (c5)$$

$$Vqa=\omega Ld\cdot ide+R\cdot iqe+\omega\phi \quad (c6)$$

Here, the predicted currents ide and iqe are regarded as predicted values corresponding to the operating state finally determined by the operating state determining section 38.

A voltage vector norm calculating section 64 calculates the norm having the average values of vda and vqa as a average voltage vector norm Ne. On the other hand, a norm target value setting section 66 set a target value Nr in accordance with the power supply voltage VDC. The target value Nr is a product of the power supply voltage VDC and the Mr·$\sqrt{(3/8)}$, where Mr is a modulation index command value. Here, Mr·$\sqrt{(3/8)}$ is a command value of a voltage utilization rate. Like the modulation index, the voltage utilization rate is a physical quantity indicating the magnitude of the quantified output voltage vector of the inverter IV.

In this embodiment, the modulation index command value Mr is set larger than 1 and smaller than the modulation index of 1.27 in the rectangular wave control. The first reason is that a sine wave voltage to actualize the maximum torque per ampere control can be sufficiently modeled by the output voltage of the inverter IV when the modulation index is lower than 1. The second reason is that the maximum value of the modulation index is equal to the value of the modulation index when the rectangular wave control is performed.

In this embodiment, the average value of magnitude of the output voltage of the inverter IV is quantified as a norm of the voltage vector on the dq-axes, and the feedback control is performed so that it is kept at the target value corresponding to the modulation index command value Mr. Accordingly, a norm deviation calculating section 68 subtracts the average voltage vector norm Ne from the norm target value Nr. A proportional integral controller 70 receives the output of the norm deviation calculating section 68, and outputs the result of the proportional integral operation. The output of the proportional integral controller 70 makes a manipulated variable to perform the feedback control to keep the average value of magnitude of the output voltage of the inverter IV at the target value. A correcting section 72 calculates the definitive command current idr by correcting the command current idr1 on the d-axis by the output of the proportional integral controller 70. A q-axis current calculating section 73 calculates the command current iqr on the q-axis from the command current idr and the torque command value Tr. This is possible because one of the d-axis current and the q-axis current is determined from the other of them and the torque.

Although the average value of magnitude of the output voltage is quantified as the average voltage vector norm Ne in this embodiment, it may be quantified as the modulation index or voltage utilization rate. Also in such cases, the same effect can be obtained by altering the gain of the proportional integral controller 70.

Figure 4:
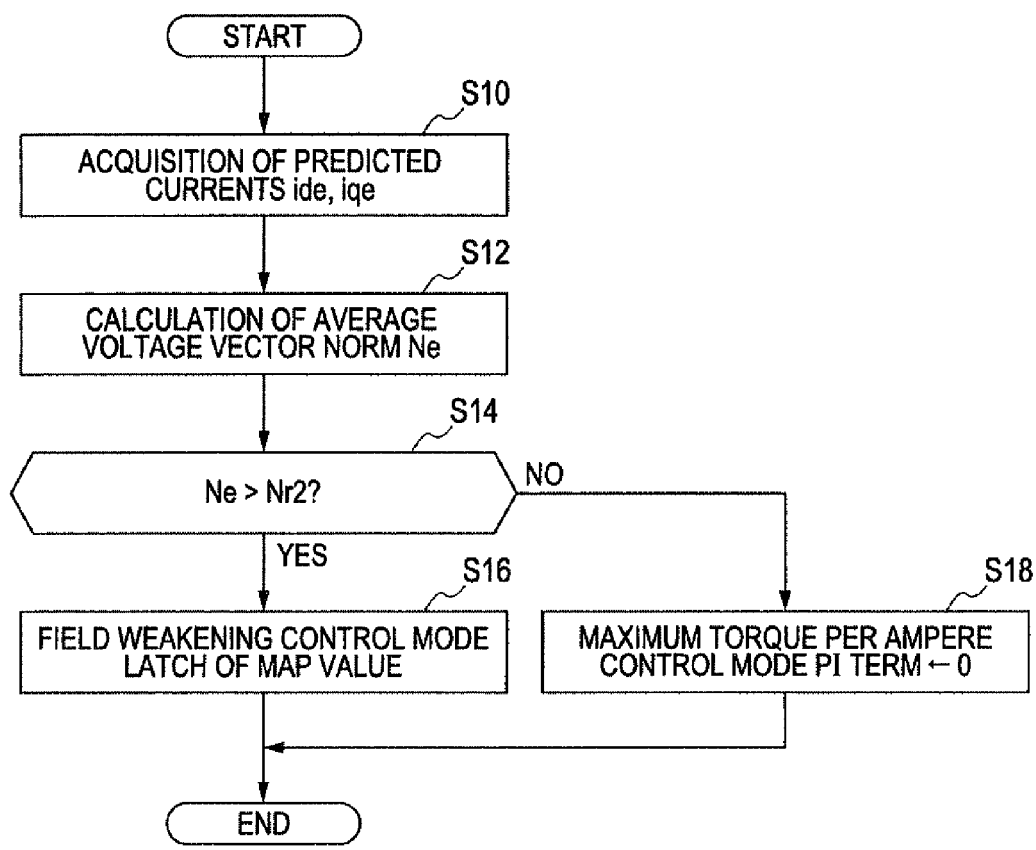
FIG. 4 is a flowchart showing the switching process between maximum torque per ampere control and field weakening control performed by the control apparatus of the first embodiment.

Next, the process to switch between the maximum torque per ampere control and the field weakening control is explained with reference to FIG. 4. This process is repeatedly performed at predetermined time intervals by the control device 14.

This process begins by acquiring the predicted currents ide and iqe corresponding to the selected voltage vector at step S10. At subsequent step S12, the average voltage vector norm Ne is calculated. At subsequent step S14, it is determined whether or not the average voltage vector norm Ne is larger than the norm target Nr2 which is smaller than the norm target value Nr. If the determination result at step S14 is affirmative, the process proceeds to step S16 to switch to the field weakening control mode by activating the proportional integral controller 70. In this mode, the correction target in the correcting section 72 is changed to the command current idr1 set by the command current setting section 52 immediately before the switching to this field weakening control mode. On the other hand, if the determination result at step S14 is negative, the process proceeds to step S18 to switch to the maximum torque per ampere control mode. In view of the fact that the id current passed in the field weakening control mode is larger on the negative side than that passed in the maximum torque per ampere control mode, the limit values of the output and the integral term of the proportional integral controller 70 are set to 0 so that the output of the PI control does not become positive. When step S12 or S16 is completed, this process is terminated.

The first embodiment described above provides the following advantages.

(1) The input parameters of the evaluation function J are manipulated so that the average value of magnitude of the output voltage of the inverter IV is feedback-controlled at the target value set in accordance with the power supply voltage VDC. This makes it possible to control the torque of the motor-generator 10 at the torque command value Tr, while setting the target value to the average value of magnitude of the output voltage of the inverter IV. Also in the overmodulation range in which the modulation index exceeds 1, there exist a plurality of currents on the dq-axes to control the actual torque at the torque command value Tr. There is a tendency that the current flowing through the motor-generator 10 increases when the above constraint with respect to the average value of magnitude of the output voltage is removed.

(2) The target value is set to the average value of magnitude of the output voltage when the modulation index exceeds 1. This makes it possible to make the fundamental component of the voltage applied to the motor-generator 10 as large as possible.

(3) The target value is set to the average value of magnitude of the output voltage when the modulation index is smaller than the modulation index to perform the rectangular wave control. This makes it possible to maintain the controllability of the feedback control at high level.

(4) The feedback control of the average value of magnitude of the output voltage is started when the modulation index reaches a predetermined value larger than 1. This makes it possible to increase the frequency that the maximum torque per ampere control is performed.

(5) The average value of magnitude of the output voltage of the inverter IV is quantified by use of the model equation of the motor-generator 10 which is inputted with the current flowing through the motor-generator 10 and does not perform any differential operation processing. This makes it possible to calculate the average value of magnitude of the output voltage only by one input sampled value of the current of the motor-generator 10.

(6) The evaluation function J is such as to receive the d-axis current and the q-axis current. This makes it possible to design the evaluation function J easily.

(7) The command current iqr on the q-axis which is not a subject of the feedback control in the field weakening control mode is calculated from the command current idr on the d-axis and the torque command value Tr. This makes it possible to set the current command value appropriately to control the torque of the motor-generator 10 at the torque command value Tr.

Second Embodiment

Next, a second embodiment of the invention is described with particular emphasis on the difference with the first embodiment.

In the second embodiment, a sub-feedback control is performed to control the current flowing through the motor-generator 10 at the command current set by the feedback control of the average value of, magnitude of the of the output voltage.

Figure 5:
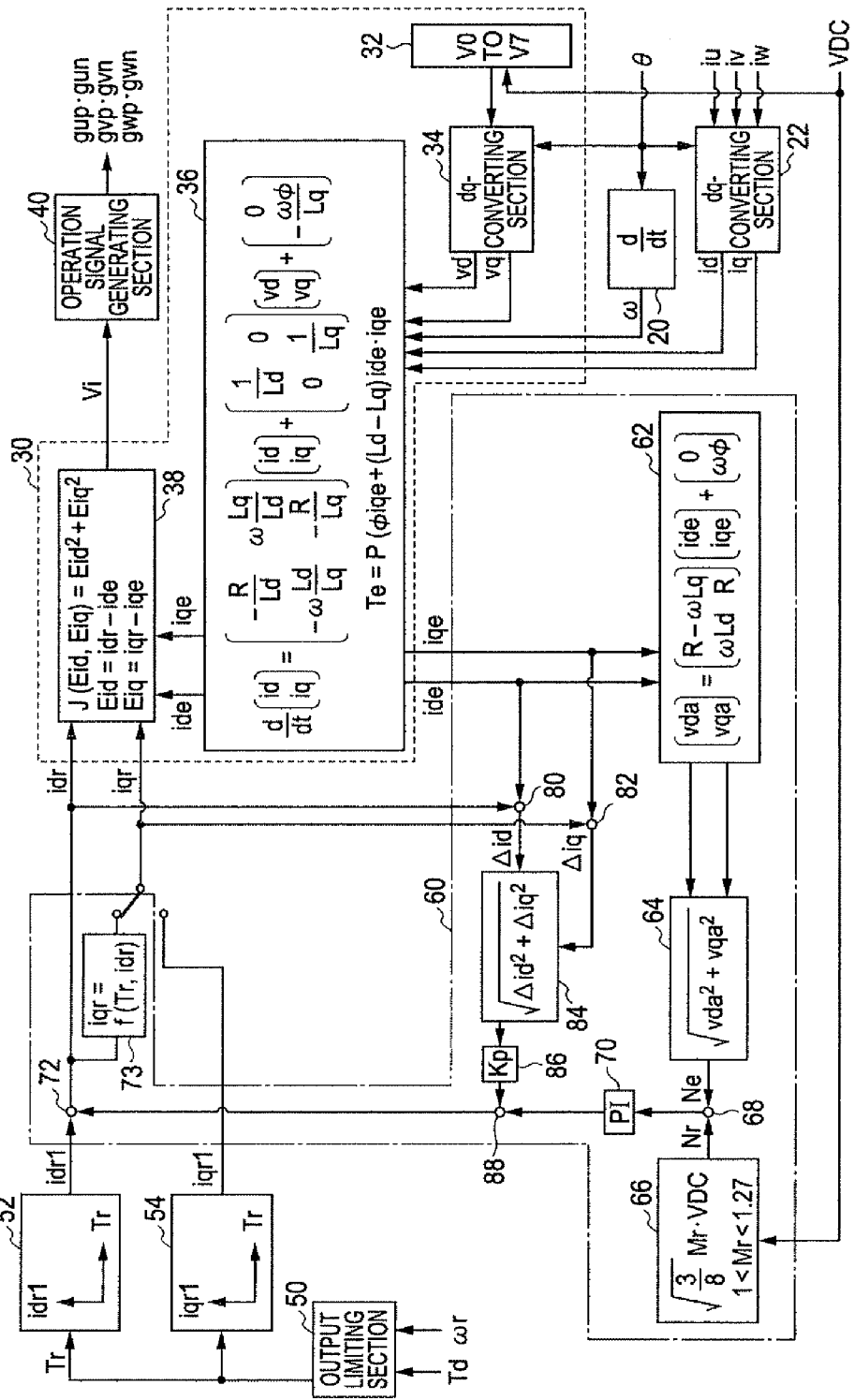
FIG. 5 is a functional block diagram explaining the operation of a control apparatus according to a second embodiment of the invention.

FIG. 5 is a functional block diagram explaining the process of model predictive control performed in this embodiment. In FIG. 5, the same reference numerals or characters identical to those shown in FIG. 3 represent the same components.

As shown in FIG. 5, a deviation calculating section 80 calculates the d-axis deviation $\Delta id$ by subtracting the predicted current ide from the command current idr. A deviation calculating section 82 calculates the q-axis deviation $\Delta iq$ by subtracting the predicted current iqe from the command current iqr. A deviation norm calculating section 84 receives the d-axis deviation $\Delta id$ and the q-axis deviation $\Delta iq$, and calculates the norm of a current deviation on the dq-axes. A proportional controller 86 is a proportional element to feedback-control the output of the deviation norm calculating section 84 at 0. A correcting section 88 corrects the output of the proportional integral controller 70 by the output of the proportional controller 86.

As a result, the command current idr on the d-axis has a value corrected from a basic value set to control the average value of magnitude of the output voltage at the target value, so that the current flowing through the motor-generator 10 is feedback-controlled at the command currents idr and iqr respectively.

The correction of the output of the proportional integral controller 70 by the output of the proportional controller 86 is performed only during the field weakening control mode. This correction may be performed only when the output of the proportional controller 86 is negative.

According to the second embodiment, other than the above advantages (1) to (7) provided by the first embodiment, the following advantage can be obtained.

(8) The manipulated variable to control the average value of magnitude of the output voltage at the target value is corrected in order to feedback-control the current flowing through the motor-generator 10 at the command value. This makes it possible to prevent the current flowing through the motor-generator 10 from deviating from the command value.

Third Embodiment

Next, a third embodiment of the invention is described with particular emphasis on the difference with the first embodiment.

In the third embodiment, sub-feedback control is performed by use of a proportional element and an integral element to control the current flowing through the motor-generator 10 at the command current set by the feedback control of the average value of magnitude of the output voltage.

Figure 6:
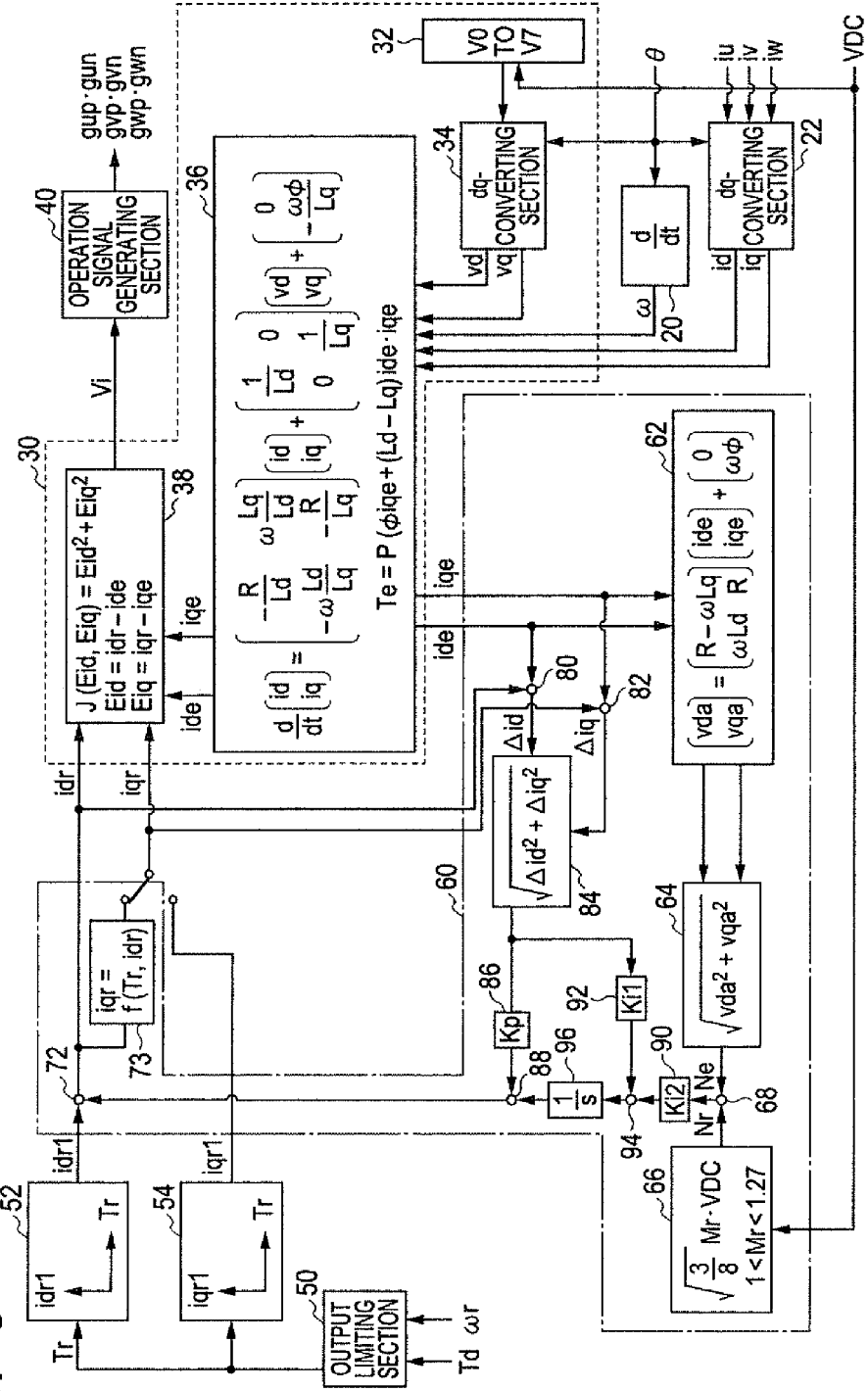
FIG. 6 is a functional block diagram explaining the operation of a control apparatus according to a third embodiment of the invention.

FIG. 6 is a functional block diagram explaining the process of model predictive control performed in this embodiment. In FIG. 6, the same reference numerals or characters identical to those shown in FIG. 3 represent the same components.

As shown in FIG. 6, the difference between the average voltage vector norm Ne and the norm target value Nr is multiplied by the integral gain Ki2 at an integral gain setting section 90. The output of the deviation norm calculating section 84 is multiplied by the integral gain Ki1 at an integral gain setting section 92. The outputs of the integral gain setting sections 90 and 92 are added to each other at an adding section 94. An integral element 96 performs integration operation on the output of the adding section 94 inputted thereto. The output of the integral element 96 is supplied to the correcting section 88.

The correction in accordance with the output of the integral gain setting section 92 or the output of the proportional controller 86 is performed only during the field weakening control mode.

As explained above, in the second embodiment, it is possible to prevent stationary deviation between the current flowing through the motor-generator 10 and the command value by use of the integral element. Further, the feedback control of the average value of magnitude of the output voltage and the feedback control of the current share the integral element 96. This facilitates designing a guard process for the integral element.

Fourth Embodiment

Next, a fourth embodiment of the invention is described with particular emphasis on the difference with the first embodiment.

In the fourth embodiment, sub-feedback control is performed to control the torque of the motor-generator 10 at the torque command value Tr.

Figure 7:
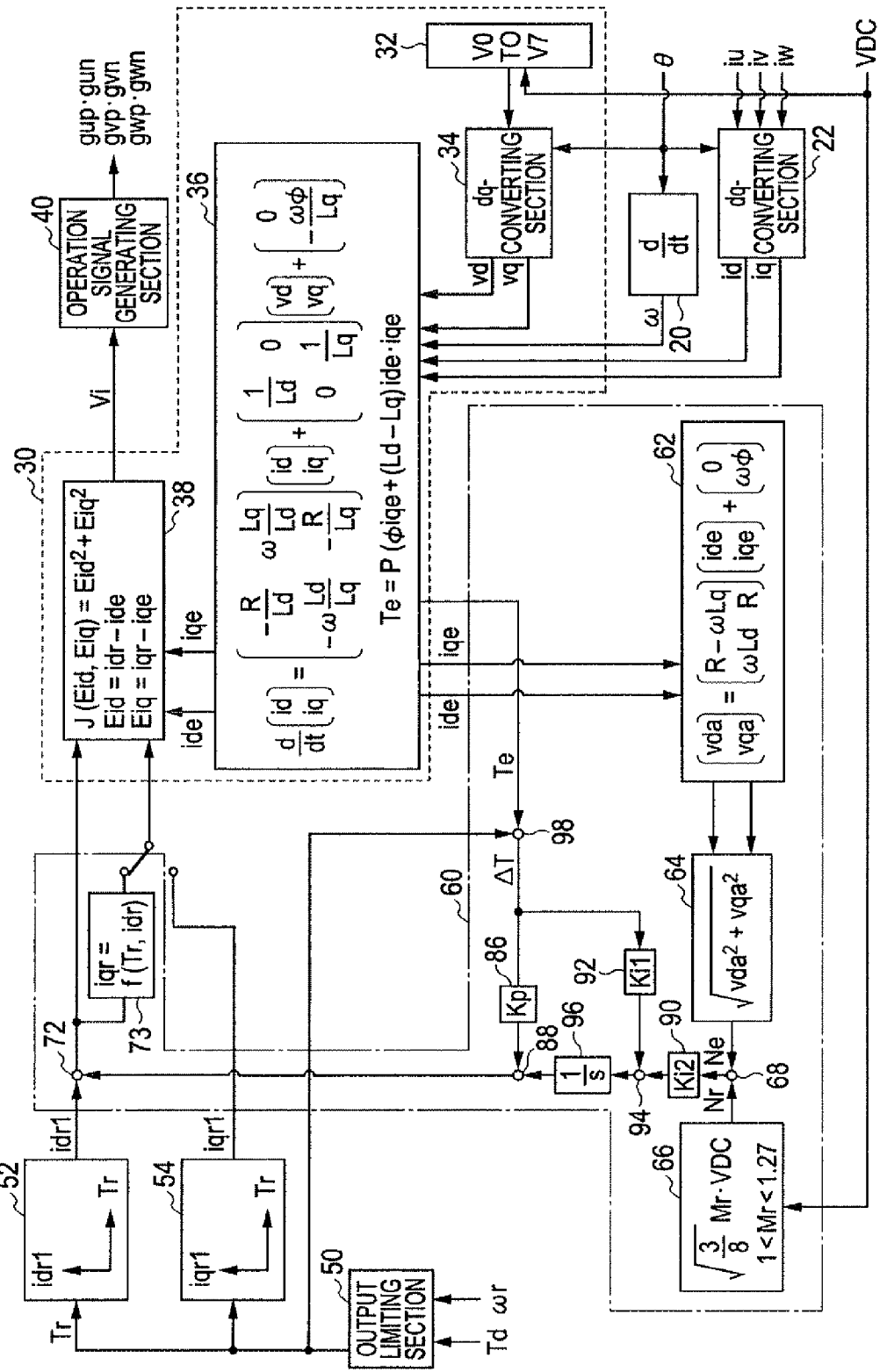
FIG. 7 is a functional block diagram explaining the operation of a control apparatus according to a fourth embodiment of the invention.

FIG. 7 is a functional block diagram explaining the process of model predictive control performed in this embodiment. In FIG. 7, the same reference numerals or characters identical to those shown in FIG. 3 represent the same components.

A deviation calculating section 98 calculates a torque deviation ΔT by subtracting predicted torque Te from the torque command value Tr. The predicted torque Te is calculated from the predicted currents ide and iqe in accordance with the following equation (c7).

$$Te = P\{\phi iqe + (Ld - Lq)ideiqe\} \quad (c7)$$

The predicted torque Te has a value corresponding to the operating state determined by the operating state determining section 38.

The torque deviation ΔT is supplied to the proportional controller 86 and the integral gain setting section 92. The proportional element and the integral element to perform the sub-feedback control of this embodiment are the same as those of the foregoing third embodiment.

The correction in accordance with the output of the integral gain setting section 92 or the output of the proportional controller 86 is performed only during the field weakening control mode.

According to the fourth embodiment, other than the above advantages (1) to (7) provided by the first embodiment, the following advantage can be obtained.

(9) The manipulated variable to control the average value of magnitude of the output voltage at the target value is corrected in order to feedback-control the torque of the motor-generator 10 at the torque command value Tr. This makes it possible to prevent the actual torque of the motor-generator 10 from deviating from the torque command value.

Fifth Embodiment

Next, a fifth embodiment of the invention is described with particular emphasis on the difference with the first embodiment.

Figure 8:
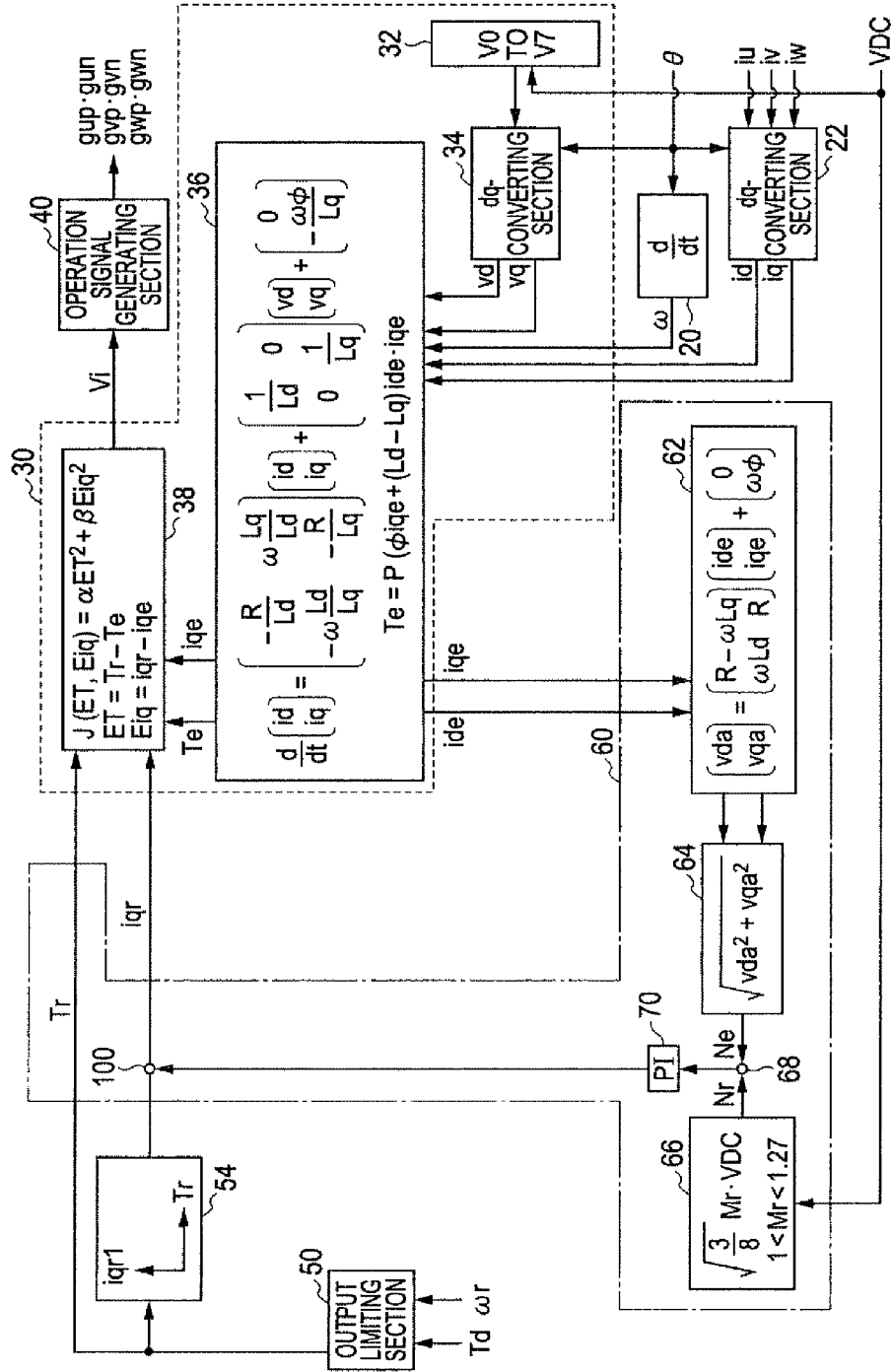
FIG. 8 is a functional block diagram explaining the operation of a control apparatus according to a fifth embodiment of the invention.

FIG. 8 is a functional block diagram explaining the process of model predictive control performed in this embodiment. In FIG. 8, the same reference numerals or characters identical to those shown in FIG. 3 represent the same components.

In this embodiment, the torque and the q-axis current are used as input parameters of the evaluation function J. In more detail, the square of the difference between the torque command value Tr and the predicted torque Te is multiplied by a weighting factor $\alpha$, and the square of the difference between the command current iqr and the predicted current iqe is multiplied by a weighting factor $\beta$ ($\alpha \neq \beta$). The sum of these weighted values is used as the evaluating function J. The reason of use of the weighting factors $\alpha$ and $\beta$ is to adjust for the different units of the torque and the current. For example, when the units of the torque and the current are set such that the torque is larger than the current in numerical value and accordingly the torque deviation is larger than the current deviation, there may occur a case where the evaluation does not decrease significantly even when the voltage vector has a small control effect on the current. In view of that the relationship between the torque and the current is represented by the above equation (c7), it is preferable that the weighting factor $\alpha$ is set to 1, and the weighting factor $\beta$ is set to the square of $P(\phi + (Ld - Lq)ide)$.

The command value of the q-axis current is set to the manipulation object to feedback-control the average value of magnitude of the output voltage. That is, the command current iqr1 set by the command current setting section 54 is corrected by the output of the proportional integral controller 70 at a correcting section 100.

According to the fifth embodiment described above, other than the above advantages (1) to (5) provided by the first embodiment, the following advantage can be obtained.

(10) One of the d-axis current and the q-axis current and the torque are used as controlled variables as input parameters of the evaluation function J, and one of the d-axis current and the q-axis current is set as the manipulation object to feedback-control the average value of magnitude of the output voltage. This makes it possible to appropriately control the torque of the motor-generator 10, while controlling the average value of magnitude of the output voltage at the target value, while Sixth Embodiment Next, a sixth embodiment of the invention is described with particular emphasis on the difference with the fifth embodiment.

In the sixth embodiment, sub-feedback control is performed to control the current flowing through the motor-generator 10 at the command current set by the feedback control of the average value of magnitude of the output voltage.

Figure 9:
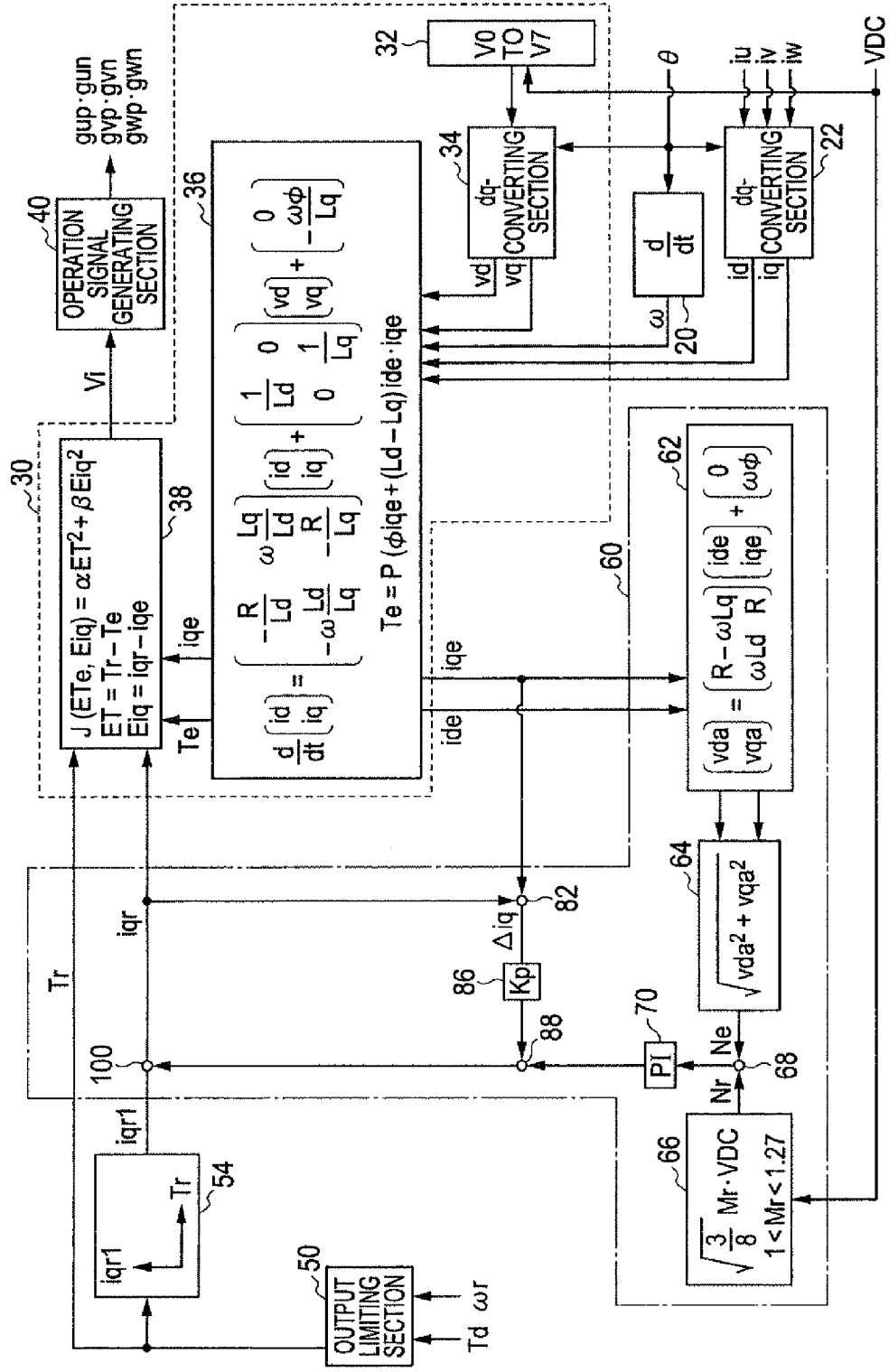
FIG. 9 is a functional block diagram explaining the operation of a control apparatus according to a sixth embodiment of the invention.

FIG. 9 is a functional block diagram explaining the process of model predictive control performed in this embodiment. In FIG. 9, the same reference numerals or characters identical to those shown in FIG. 8 represent the same components.

In this embodiment, the q-axis deviation Δiq outputted from the deviation calculating section 82 is supplied to the proportional controller 86. This sub-feedback control corresponds to that performed in the second embodiment.

According to the sixth embodiment described above, other than the above advantages (1) to (5) provided by the first embodiment, and the advantage (10) provided by the fifth embodiment, the following advantage can be obtained.

(11) The manipulated variable to control the average value of magnitude of the output voltage at the target value is corrected in order to feedback-control the current flowing through the motor-generator 10 at the command value. This makes it possible to prevent the current flowing through the motor-generator 10 from deviating from the command value.

Seventh Embodiment

Next, a seventh embodiment of the invention is described with particular emphasis on the difference with the fifth embodiment.

In the seventh embodiment, sub-feedback control is performed by use of a proportional element and an integral element to control the current flowing through the motor-generator 10 at the command current.

Figure 10:
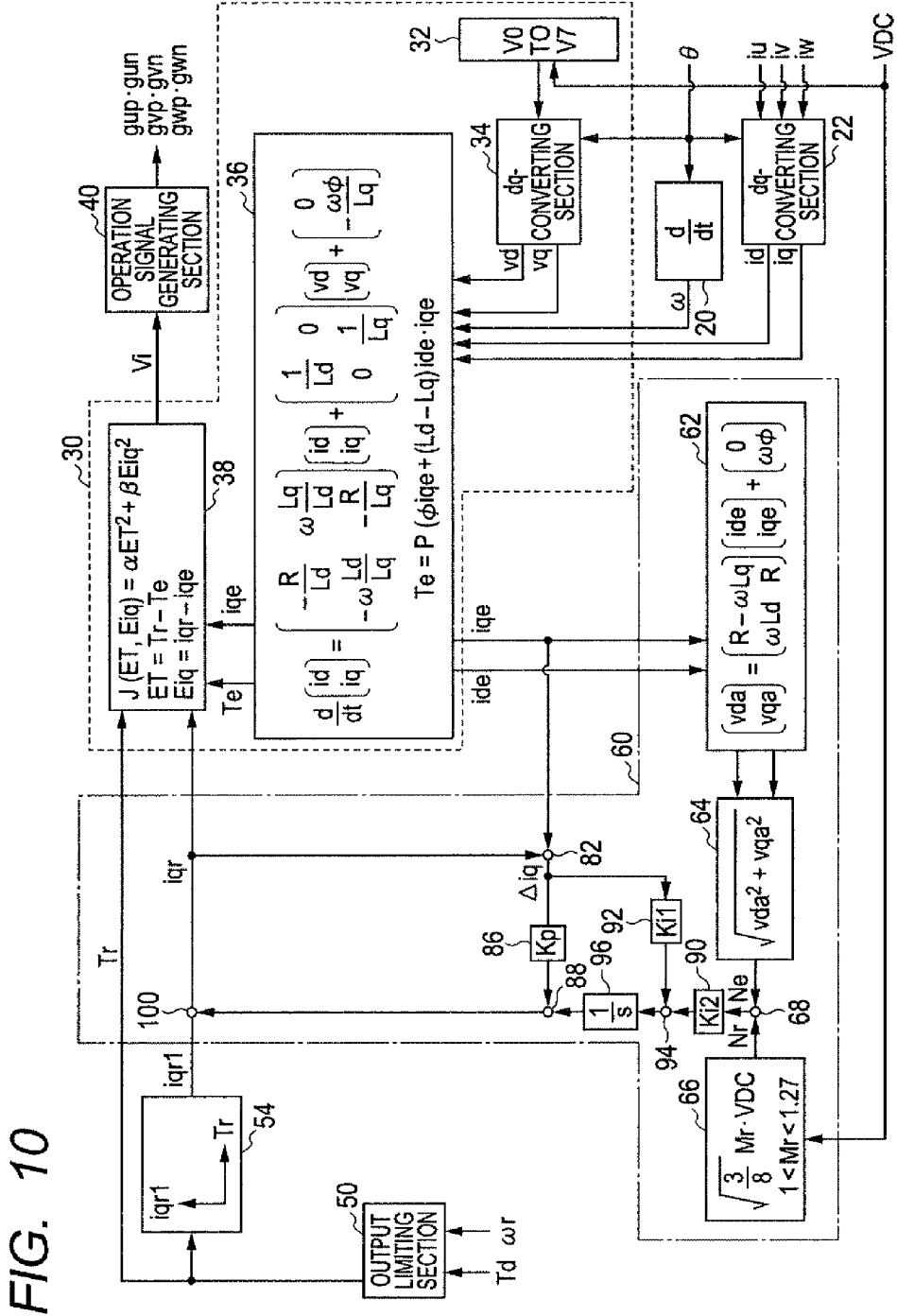
FIG. 10 is a functional block diagram explaining the operation of a control apparatus according to a seventh embodiment of the invention.

FIG. 10 is a functional block diagram explaining the process of model predictive control performed in this embodiment. In FIG. 10, the same reference numerals or characters identical to those shown in FIG. 8 represent the same components.

As shown in FIG. 10, the q-axis deviation Δiq calculated by the deviation calculating section 82 is supplied to the proportional controller 86 and the integral gain setting section 92. This sub-feedback control is the same as that performed in the third embodiment.

Eighth Embodiment

Next, an eighth embodiment of the invention is described with particular emphasis on the difference with the fifth embodiment.

In the eighth embodiment, sub-feedback control is performed to control the torque of the motor-generator 10 at the torque command value Tr.

Figure 11:
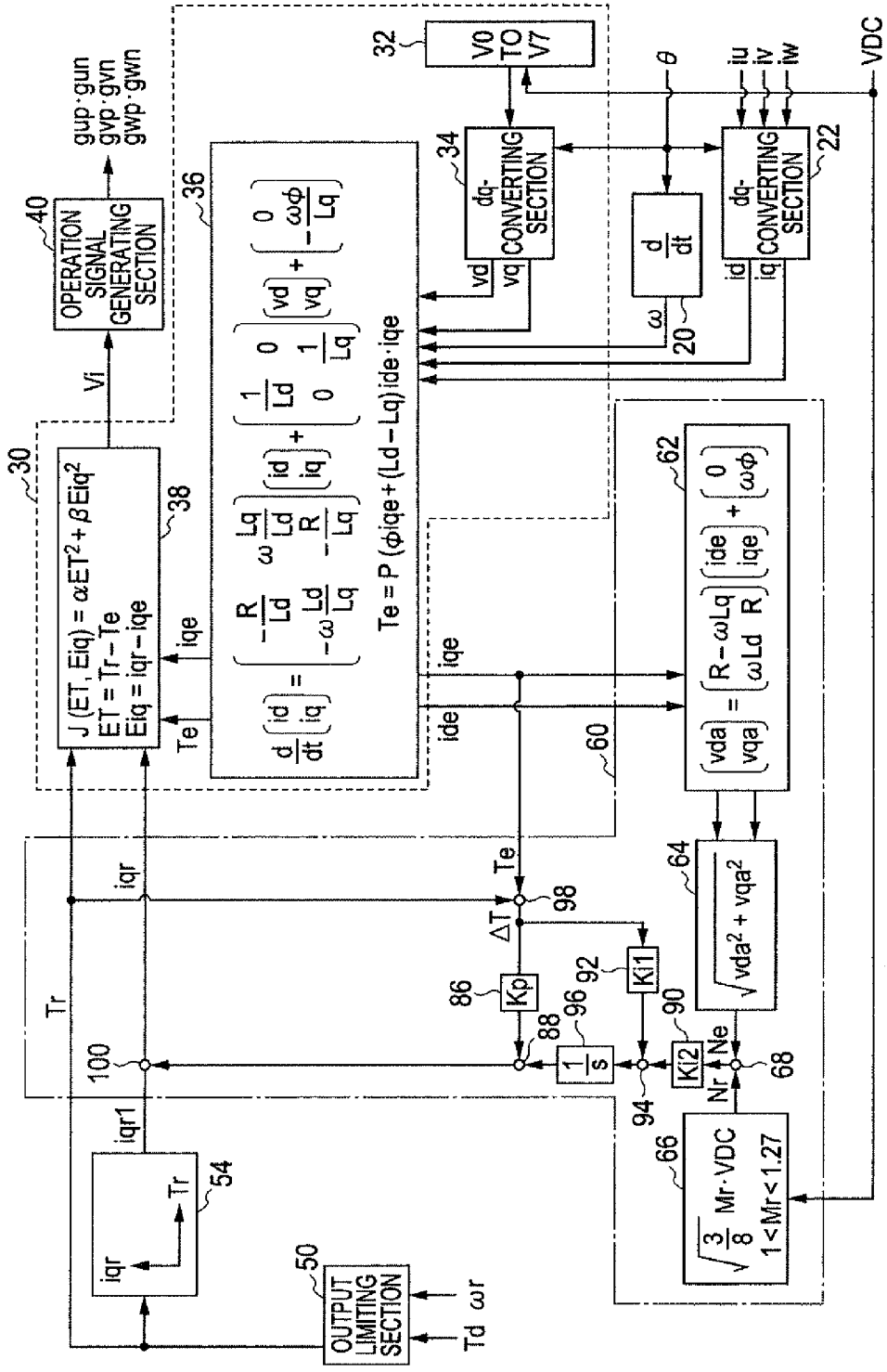
FIG. 11 is a functional block diagram explaining the operation of a control apparatus according to an eighth embodiment of the invention.

FIG. 11 is a functional block diagram explaining the process of model predictive control performed in this embodiment. In FIG. 11, the same reference numerals or characters identical to those shown in FIG. 8 represent the same components.

As shown in FIG. 11, the torque deviation ΔT calculated by subtracting the predicted torque Te from the torque command value Tr is supplied to the proportional controller 86 and the integral gain setting section 92. The proportional element and the integral element to perform the sub-feedback control of this embodiment are basically the same as those of the foregoing third embodiment.

According to the eighth embodiment described above, other than the above advantages (1) to (5) provided by the first embodiment, and the advantage (10) provided by the fifth embodiment, the following advantage can be obtained.

(12) The manipulated variable to control the average value of magnitude of the output voltage at the target value is corrected in order to feedback-control the torque of the motor-generator 10 at the torque command value Tr. This makes it possible to prevent the actual torque of the motor-generator 10 from deviating from the torque command value.

Ninth Embodiment

Next, a ninth embodiment of the invention is described with particular emphasis on the difference with the fifth embodiment.

Figure 12:
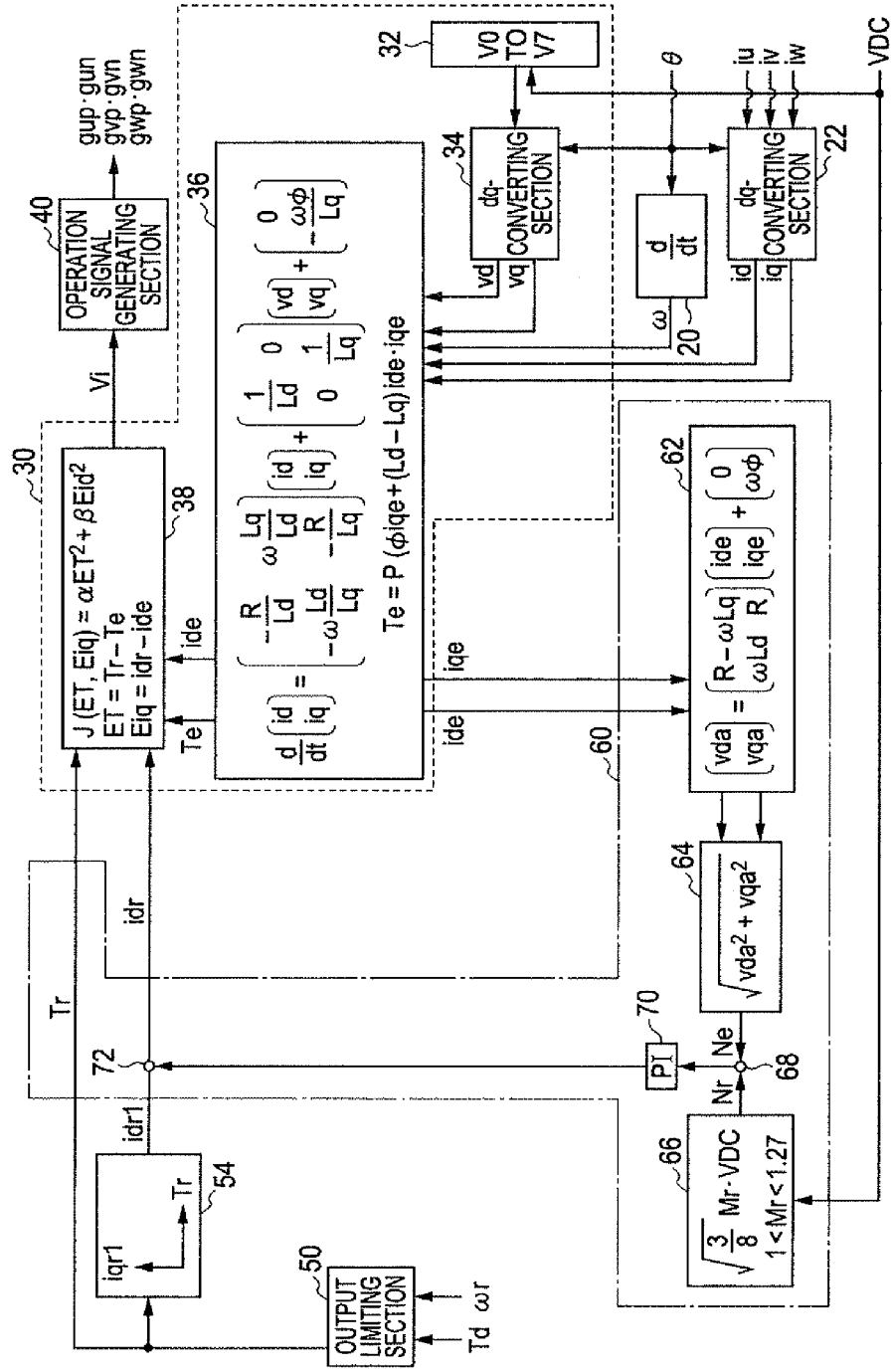
FIG. 12 is a functional block diagram explaining the operation of a control apparatus according to a ninth embodiment of the invention.

FIG. 12 is a functional block diagram explaining the process of model predictive control performed in this embodiment. In FIG. 12, the same reference numerals or characters identical to those shown in FIG. 8 represent the same components.

In this embodiment, the torque and the d-axis current of the motor-generator 10 are used as input parameters of the evaluation function J. In more detail, the square of the difference between the torque command value Tr and the predicted torque Te is multiplied by a weighting factor $\alpha$, and the square of the difference between the command current idr and the predicted current ide is multiplied by a weighting factor $\beta$ ($\alpha \neq \beta$). The sum of these weighted values is used as the evaluation function J. The reason of use of the weighting factors $\alpha$ and $\beta$ is to adjust for the different units of the torque and the current.

The command value of the d-axis current is set as the manipulation object to feedback-control the average value of magnitude of the output voltage.

Tenth Embodiment

Next, a tenth embodiment of the invention is described with particular emphasis on the difference with the fifth embodiment.

In the tenth embodiment, sub-feedback control is performed to control the current flowing through the motor-generator 10 at the command value.

Figure 13:
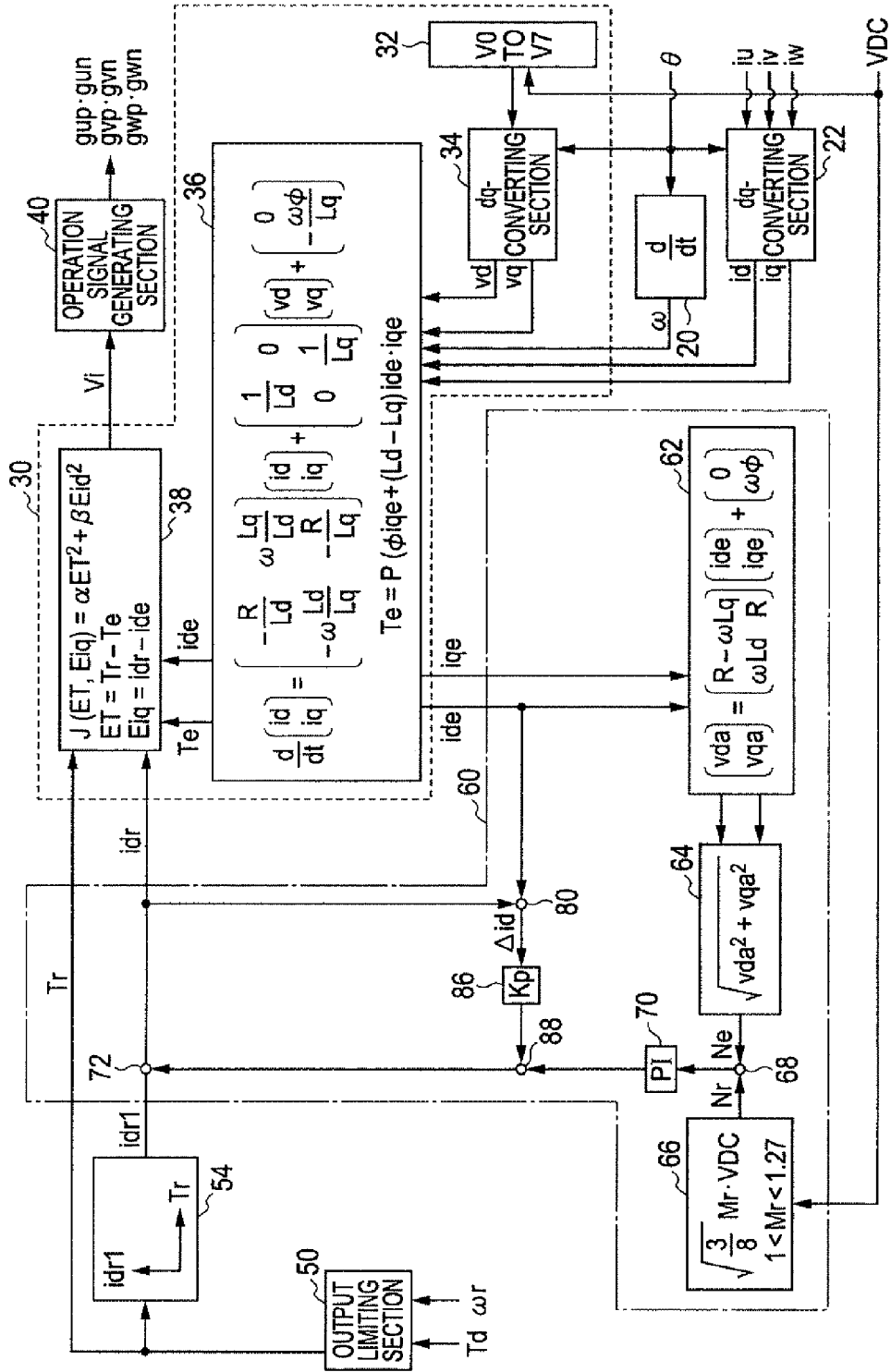
FIG. 13 is a functional block diagram explaining the operation of a control apparatus according to a tenth embodiment of the invention.

FIG. 13 is a functional block diagram explaining the process of model predictive control performed in this embodiment. In FIG. 13, the same reference numerals or characters identical to those shown in FIG. 12 represent the same components.

In this embodiment, the d-axis deviation Δid outputted from the deviation calculating section 80 is supplied to the proportional controller 86. This sub-feedback control corresponds to that performed in the sixth embodiment.

Eleventh Embodiment

Next, an eleventh embodiment of the invention is described with particular emphasis on the difference with the fifth embodiment.

In the seventh embodiment, sub-feedback control is performed by use of a proportional element and an integral element to control the current flowing through the motor-generator 10 at the command current.

Figure 14:
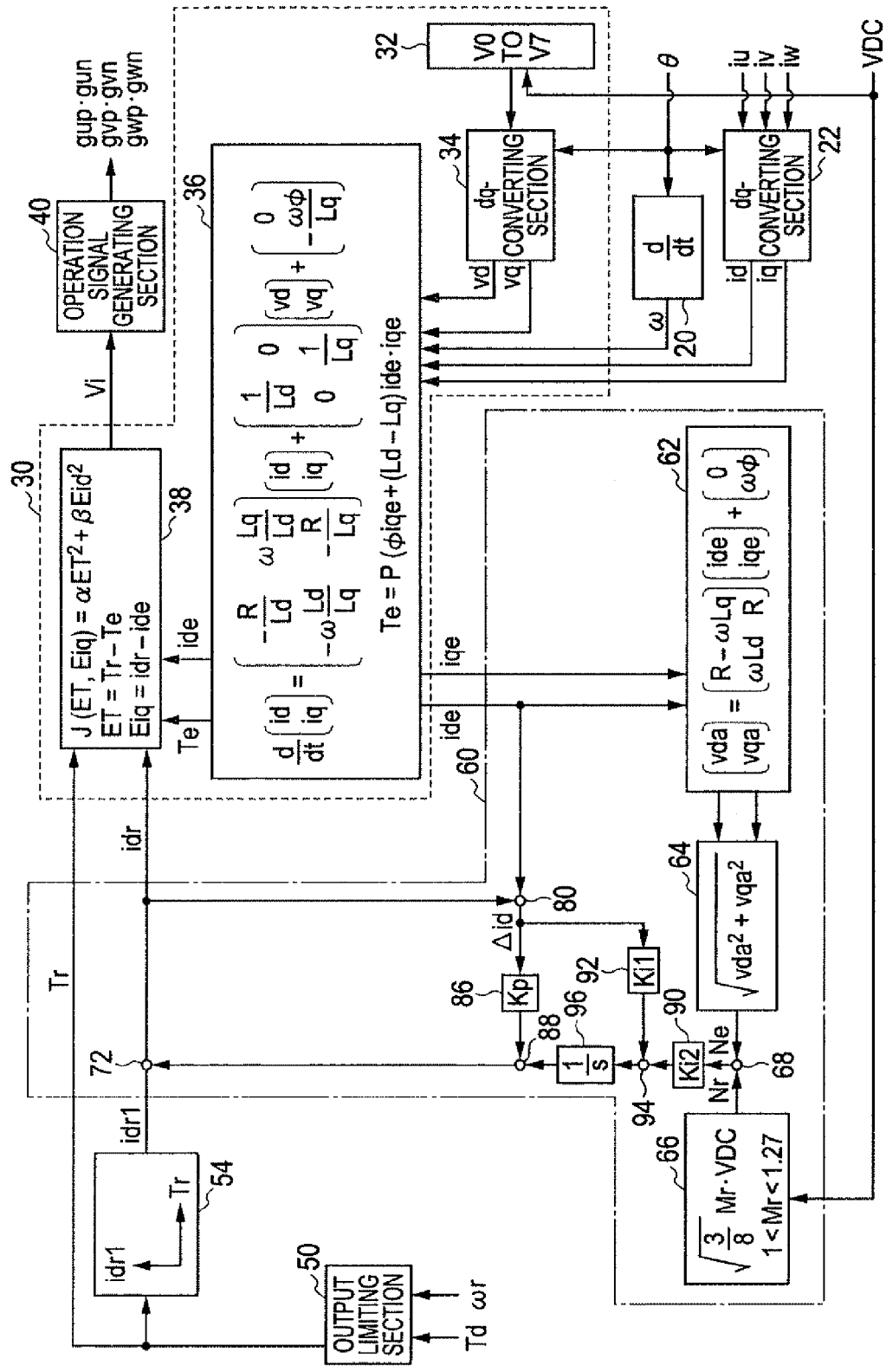
FIG. 14 is a functional block diagram explaining the operation of a control apparatus according to an eleventh embodiment of the invention.

FIG. 14 is a functional block diagram explaining the process of model predictive control performed in this embodiment. In FIG. 14, the same reference numerals or characters identical to those shown in FIG. 8 represent the same components.

As shown in FIG. 14, the d-axis deviation Δid calculated by the deviation calculating section 80 is supplied to the proportional controller 86 and the integral gain setting section 92. This sub-feedback control is the same as that performed in the seventh embodiment.

Twelfth Embodiment

Next, a twelfth embodiment of the invention is described with particular emphasis on the difference with the fifth embodiment.

In the twelfth embodiment, sub-feedback control is performed to control the torque of the motor-generator 10 at the torque command value Tr.

Figure 15:
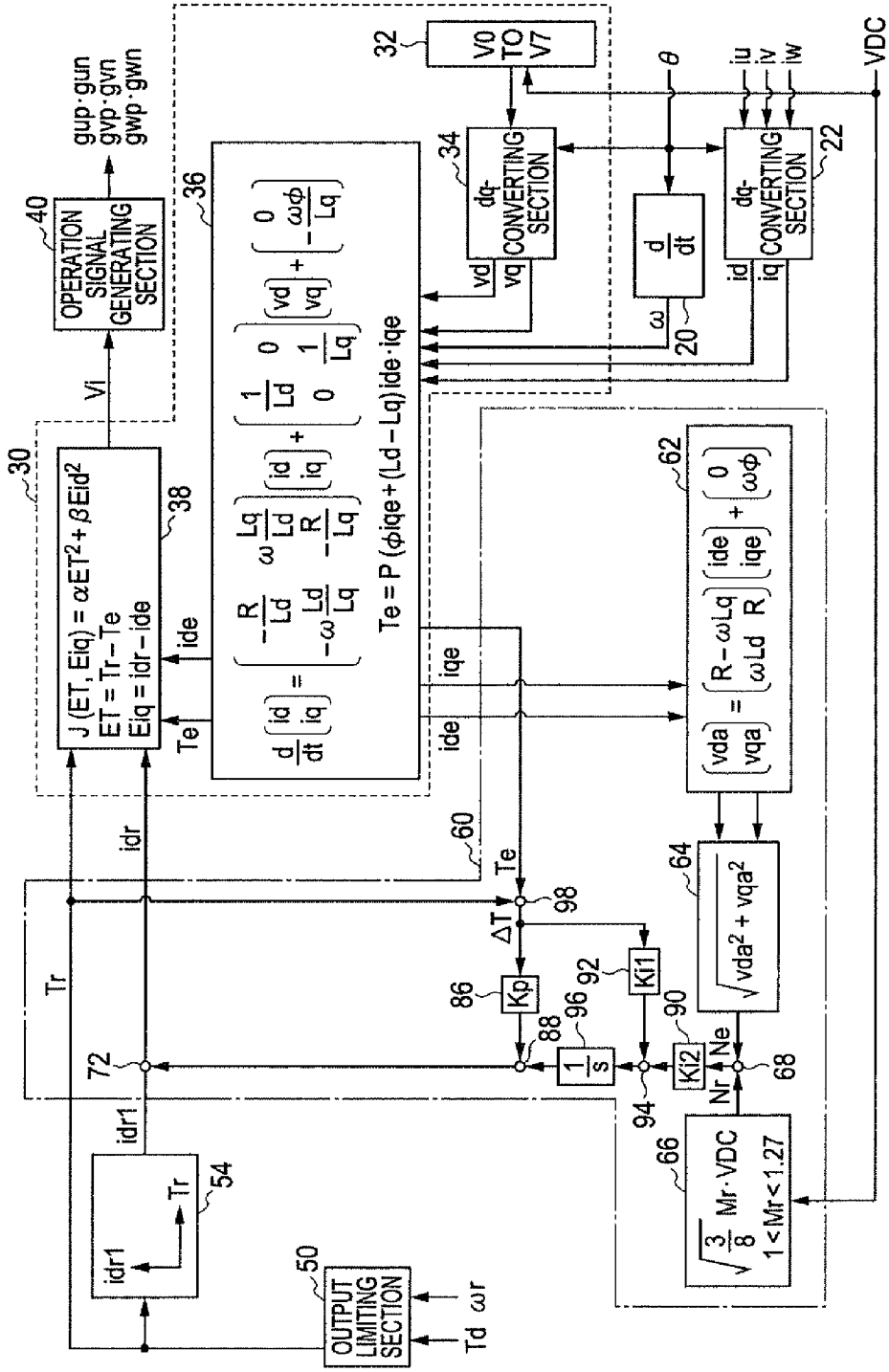
FIG. 15 is a functional block diagram explaining the operation of a control apparatus according to a twelfth embodiment of the invention.

FIG. 15 is a functional block diagram explaining the process of model predictive control performed in this embodiment. In FIG. 15, the same reference numerals or characters identical to those shown in FIG. 8 represent the same components.

As shown in FIG. 15, the torque deviation ΔT calculated by subtracting the predicted torque Te from the torque command value Tr is supplied to the proportional controller 86 and the integral gain setting section 92. The proportional element and the integral element to perform the sub-feedback control of this embodiment are basically the same as those of the foregoing eighth embodiment.

Thirteenth Embodiment

Next, a thirteenth embodiment of the invention is described with particular emphasis on the difference with the first embodiment.

Figure 16:
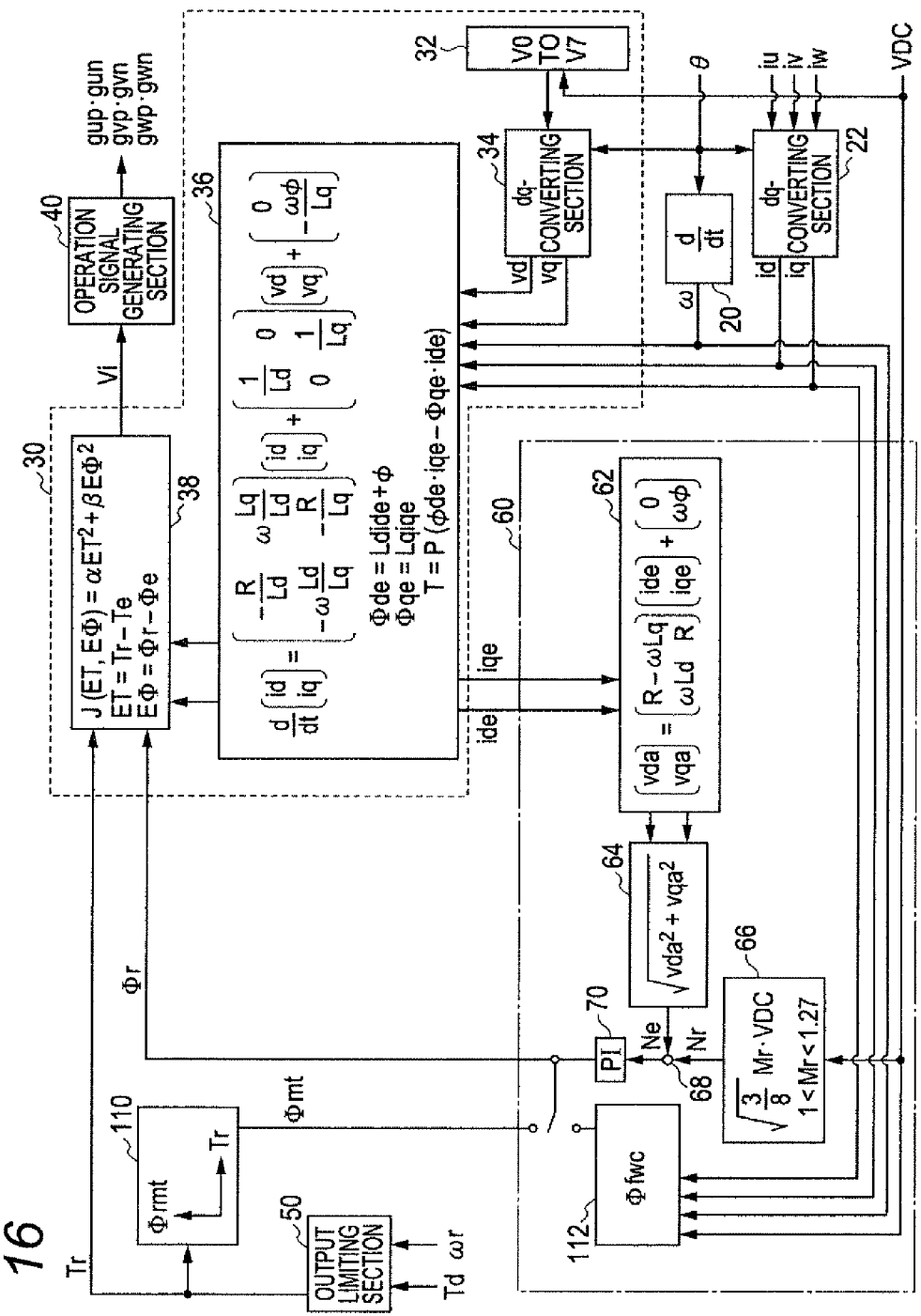
FIG. 16 is a functional block diagram explaining the operation of a control apparatus according to a thirteenth embodiment of the invention.

FIG. 16 is a functional block diagram explaining the process of model predictive control performed in this embodiment. In FIG. 16, the same reference numerals or characters identical to those shown in FIG. 3 represent the same components.

In this embodiment, the torque and the flux linkage of the motor-generator 10 are used as input parameters of the evaluation function J. In more detail, the square of the difference between the torque command value Tr and the predicted torque Te is multiplied by a weighting factor α, and the square of the difference between a flux norm command value Φr and a predicted flux norm Φe is multiplied by a weighting factor β (α≠β). The sum of these weighted values is used as the evaluation function J. The reason of use of the weighting factors α and β is to adjust for the different units of the absolute numerical values of the torque and the flux norm.

During the maximum torque per ampere control, a maximum torque flux command value setting section 110 sets a flux norm command value Φrmt to perform the maximum torque per ampere control in accordance with the torque command value Tr inputted thereto.

In this embodiment, the flux norm command value is set by feedforward control during the field weakening control. In more detail, a field weakening flux-norm-command-value setting section 112 calculates, in accordance with the actual currents id and iq, the electrical angular velocity ω and the power supply voltage VDC inputted thereto, a flux linkage norm (flux norm command value Φfwc) as a feedforward manipulated variable to control the average value of magnitude of the output voltage at the target value.

Here, a method of calculating the flux norm command value Φfwc is explained.

The terminal voltage Vam of the motor-generator 10 is represented by the following equation (c8) when the induced voltage and the current is Vo and I, respectively.

$$Vam = Vo + RI \qquad (c8)$$

The following equation (c9) is derived from the above equation (c8) when the angle θf between the d-axis positive direction and the flux linkage vector is represented by arctan (Lqiq/(Ldid+φ)).

$$Vam^2 = \{Vo\cos(\theta f \pm \pi/2) + Rid\}^2 + \{Vo\sin(\theta f \pm \pi/2) + Riq\}^2 \qquad (c9)$$

In the above equation (c9), the positive sign corresponds to the normal rotation of the motor-generator 10, and the negative sign corresponds to the reverse rotation of the motor-generator 10.

By solving the above equation (c9) with respect to the induced voltage V0, the following equation (c10) can be obtained.

$$V_O = -R\begin{pmatrix} -id\sin(\theta f \pm \pi/2) + \\ iq\cos(\theta f \pm \pi/2) \end{pmatrix} + \sqrt{R^2\begin{pmatrix} -id\sin(\theta f \pm \pi/2) + \\ iq\cos(\theta f \pm \pi/2) \end{pmatrix}^2 + Vam^2 - R^2I^2} \qquad (c10)$$

Since ωΦfwc=Vo, the above equation (c10) can be transformed to following equation (c11) representing the flux norm command value Φfwc.

$$\Phi fwc = \frac{-R\begin{pmatrix} -id\sin(\theta f \pm \pi/2) + \\ iq\cos(\theta f \pm \pi/2) \end{pmatrix} + \sqrt{R^2\begin{pmatrix} -id\sin(\theta f \pm \pi/2) + \\ iq\cos(\theta f \pm \pi/2) \end{pmatrix}^2 + Vam^2 - R^2I^2}}{|\omega|} \qquad (c11)$$

The thus calculated flux norm command value Φfwc is corrected by the manipulated variable to feedback-control the average value of magnitude of the output voltage, to be the final flux norm command value Φr.

Figure 17:
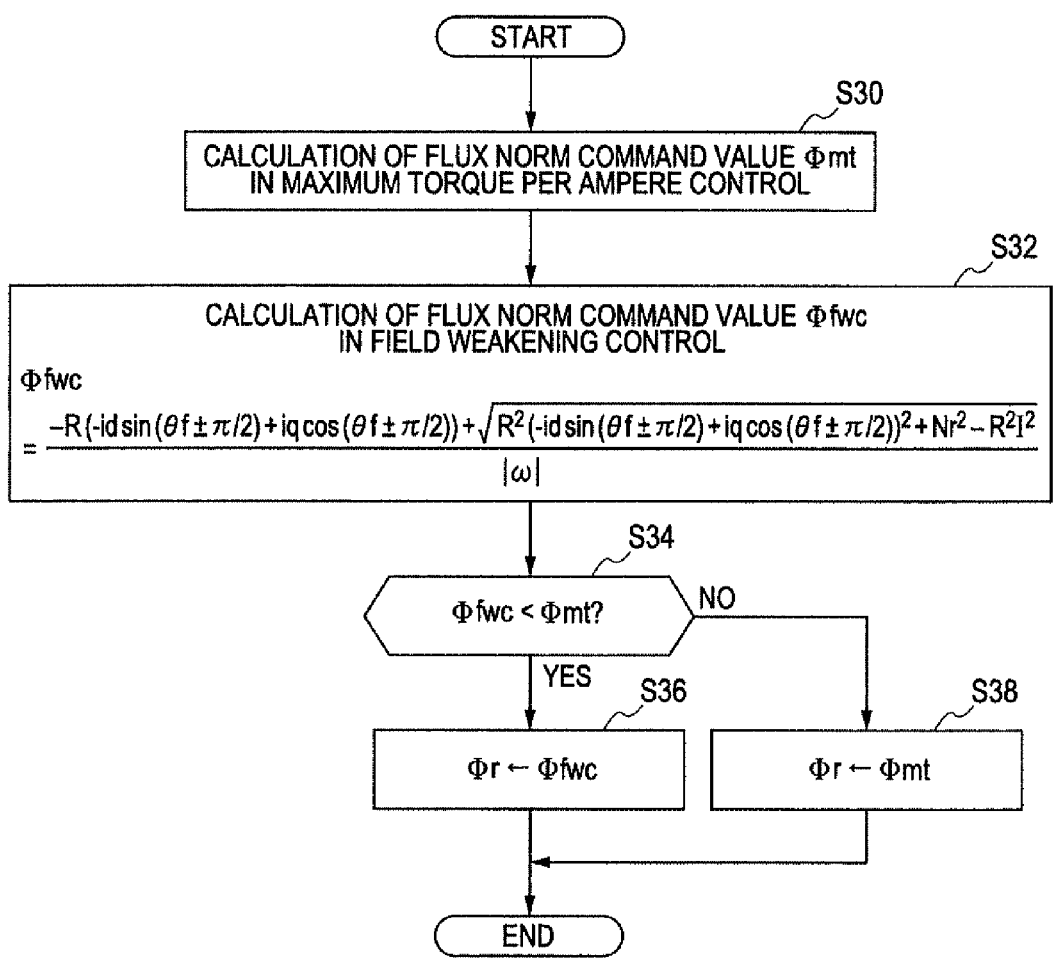
FIG. 17 is a flowchart showing the switching process of flux command values performed by the control apparatus of the thirteenth embodiment.

FIG. 17 is a flowchart showing the operation of switching between the flux norm command value Φmt in the maximum torque per ampere control and the flux norm command value Φfwc in the field weakening control. This process is performed repeatedly at regular time intervals by the control device 14.

This process begins by calculating, at step S30, the flux norm command value Φmt for the maximum torque per ampere control. At subsequent step S32, the flux norm command value Φfwc for the field weakening control is calculated. Here, the flux norm command value Φfwc is calculated in accordance with equation (c11) where the terminal voltage Vam has been replaced by a norm target value Nr.

At subsequent step S34, it is determined whether or not the flux norm command value Φfwc in the field weakening control is smaller than the flux norm command value Φmt in the maximum torque per ampere control. This step S34 is provided for determining whether or not a condition to use the flux norm command value Φfwc for the field weakening control has been satisfied. If the determination result at step S34 is affirmative, the process proceeds to step S36 where the flux norm command value Φr as the command value (input parameter of the evaluation function J) of the controlled variable of the motor-generator 10 is set as the flux norm command value Φfwc for the field weakening control. If the determination result at step S34 is negative, the process proceeds to step S38 where the flux norm command value Φr is set as the flux norm command value Φmt for the maximum torque per ampere control.

When step S36 or step S38 is completed, the process is terminated.

According to the thirteenth embodiment described above, other than the above advantages (1) to (5) provided by the first embodiment, the following advantage can be obtained.

(13) The magnitude of the flux linkage to control the average value of magnitude of the output voltage of the inverter IV at the target value is set as the flux norm command value Φfwc, in accordance with the electrical angular velocity ω of the motor-generator 10, the power supply voltage VDC and the current flowing through the motor-generator 10. As a result, since the average value of magnitude of the output voltage can be feedforward-controlled at the target value, it is possible to improve the control response with respect to the controlled variables of the motor-generator 10. Especially, since the magnitude of the flux linkage can be obtained by analytical approximate calculation by use of a model with respect to the voltage applied to the motor-generator 10, it is also possible to reduce man-hour for designing the feedforward control means.

(14) The condition to use the flux norm command value Φfwc for the field weakening control is set that the flux norm command value Φfwc is smaller than the flux norm command value Φmt for the maximum torque per ampere control. This makes it possible to perform the maximum torque per ampere control preferentially.

Fourteenth Embodiment

Next, a fourteenth embodiment of the invention is described with particular emphasis on the difference with the thirteenth embodiment.

In this embodiment, the d-axis current and the q-axis current are used as input parameters of the evaluation function J.

Figure 18:
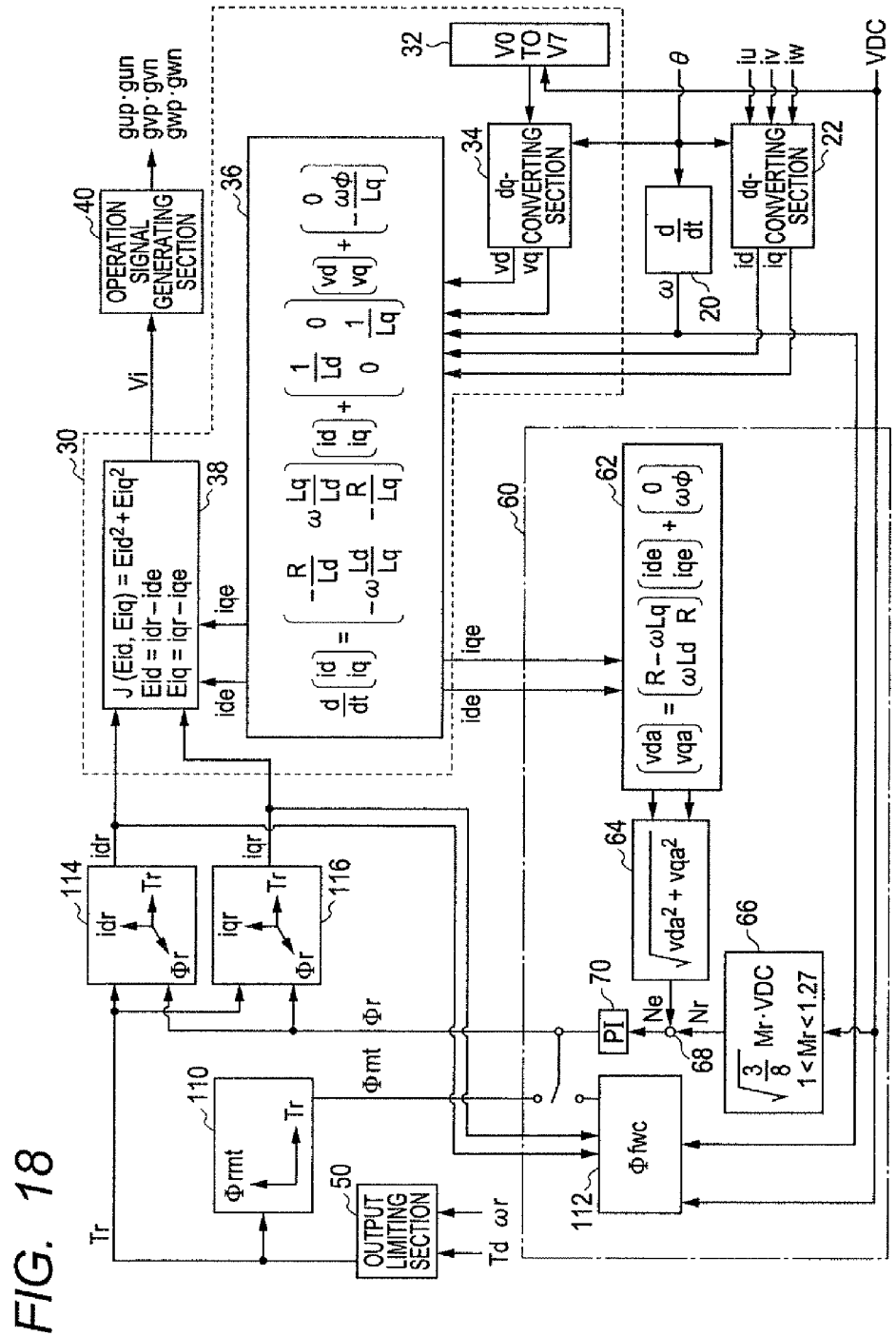
FIG. 18 is a functional block diagram explaining the operation of a control apparatus according to a fourteenth embodiment of the invention.

FIG. 18 is a functional block diagram explaining the process of model predictive control performed in this embodiment. In FIG. 18, the same reference numerals or characters identical to those shown in FIG. 16 represent the same components.

As shown in FIG. 18. this embodiment includes a command current setting section 114 which sets the d-axis command current idr in accordance with the flux norm command value Φr and torque command value Tr inputted thereto, and a command current setting section 116 which sets the q-axis command current iqr in accordance with the flux norm command value Φr and torque command value Tr inputted thereto. The command currents idr and iqr are used as input parameters of the evaluation function J.

In this embodiment, the field weakening flux-norm-command-value setting section 112 receives the command currents idr and iqr instead of the actual currents id and iq.

According to the fourteenth embodiment described above, other than the above advantages (1) to (5) provided by the first embodiment, and the advantages (13) and (14) provided by the thirteenth embodiment, the following advantage can be obtained.

(15) The command current setting sections 114 and 116 are provided to set the command currents idr and iqr respectively in accordance with the flux norm command value Φr and the torque command value Tr. This makes it possible to design the evaluation function J easily.

Fifteenth Embodiment

Next, a fifteenth embodiment of the invention is described with particular emphasis on the difference with the first embodiment.

Figure 19:
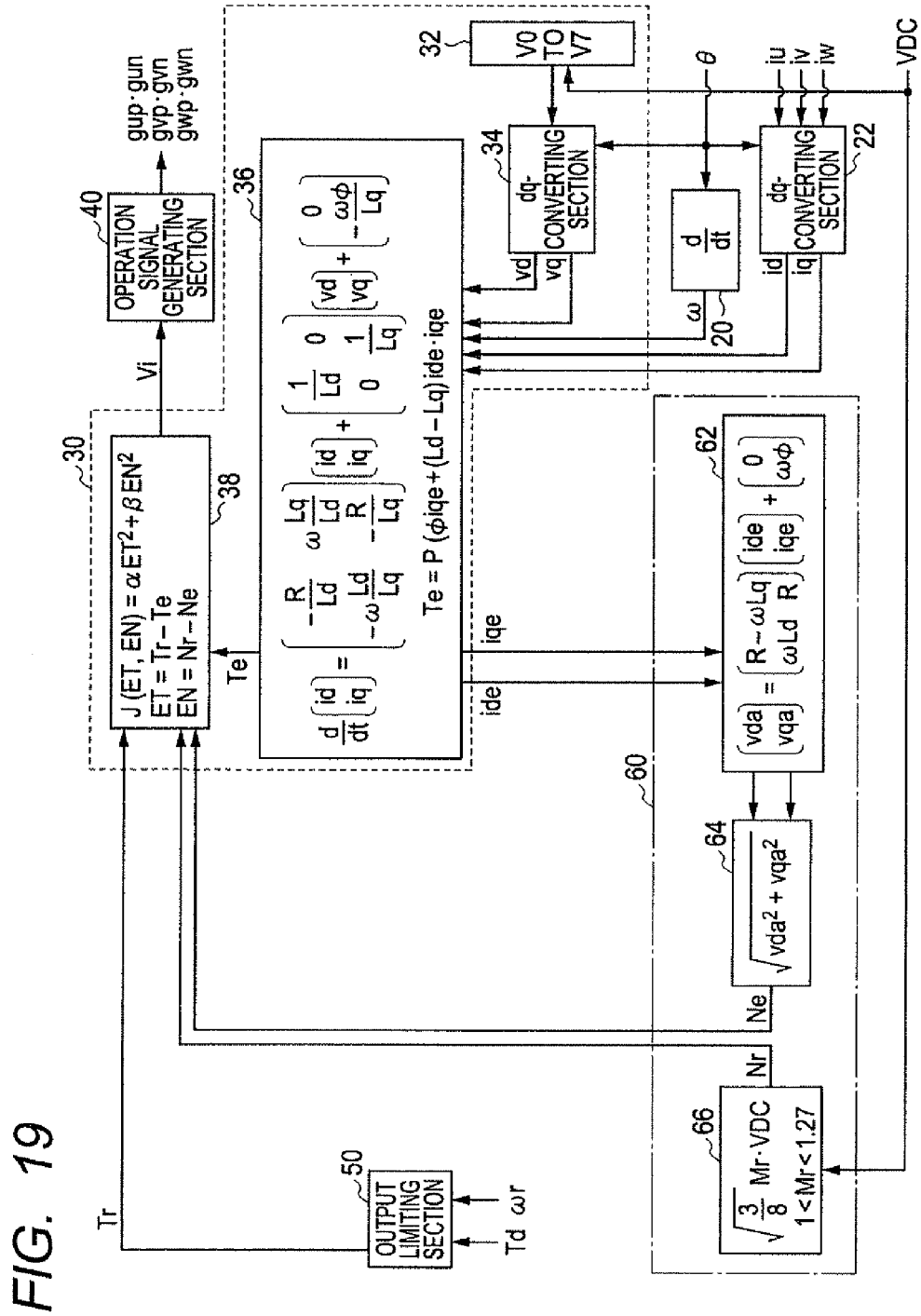
FIG. 19 is a functional block diagram explaining the operation of a control apparatus according to a fifteenth embodiment of the invention.

FIG. 19 is a functional block diagram explaining the field weakening control performed in this embodiment. In FIG. 19, the same reference numerals or characters identical to those shown in FIG. 3 represent the same components.

In this embodiment, the average value of magnitude of the output voltage of the inverter IV and the torque of the motor-generator 10 are used as input parameters of the evaluation function J. In more detail, the square of the difference between the average voltage vector norm Ne calculated by the voltage vector norm calculating section 64 and the norm target value Nr calculated by the norm target value setting section 66 is multiplied by a weighting factor α, and the square of the difference between the torque command value Tr and the predicted torque Te is multiplied by a weighting factor β ($\alpha \neq \beta$). The sum of these weighted values is used as the evaluation function J.

Sixteenth Embodiment

Next, a sixteenth embodiment of the invention is described with particular emphasis on the difference with the first embodiment.

Figure 20:
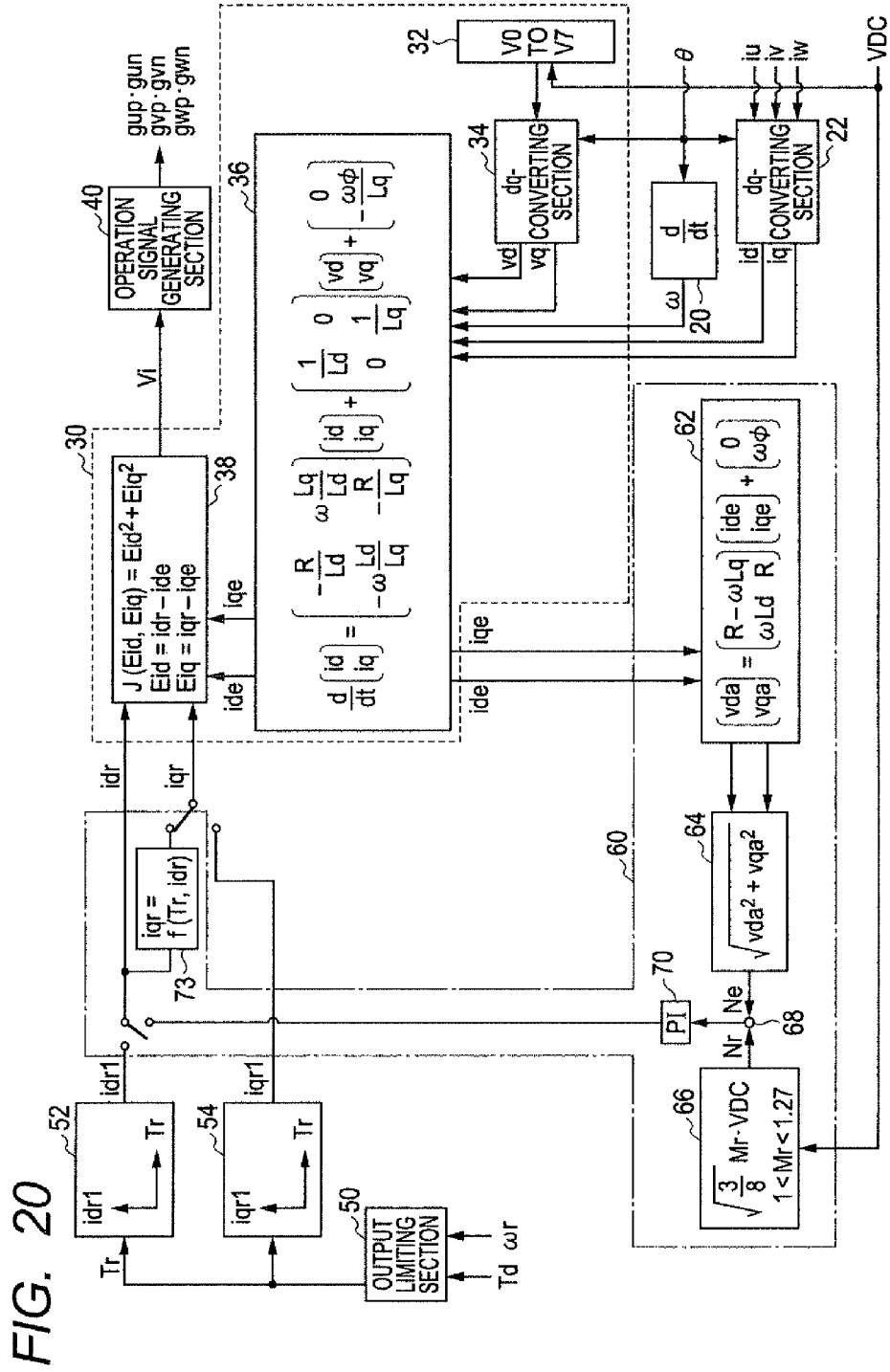
FIG. 20 is a functional block diagram explaining the operation of a control apparatus according to a sixteenth embodiment of the invention.

FIG. 20 is a functional block diagram explaining the process of model predictive control performed in this embodiment. In FIG. 20, the same reference numerals or characters identical to those shown in FIG. 3 represent the same components. As shown in FIG. 20, in this embodiment, the command value in the field weakening control is set independently of the command value (command current idr1) in the maximum torque per ampere control.

Figure 21:
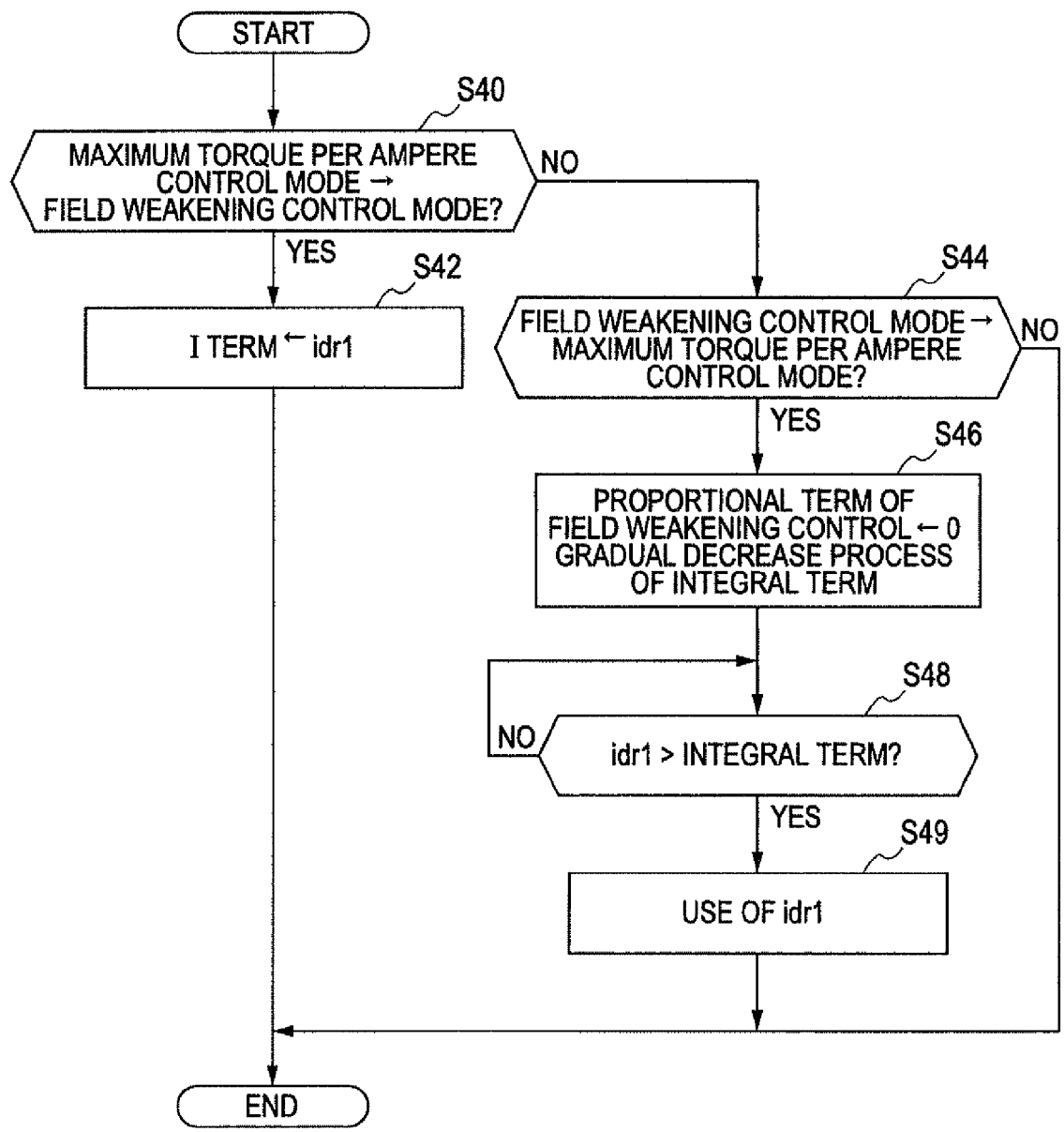
FIG. 21 is a flowchart showing the switching process between maximum torque per ampere control and field weakening control performed by the control apparatus of the sixteenth embodiment.

FIG. 21 shows the process to switch between the maximum torque per ampere control and the field weakening control. This process is performed repeatedly at regular time intervals by the control device 14.

This process begins by determining, at step S40, whether or not it is time to switch from the maximum torque per ampere control mode to the field weakening control mode. If the determination result at step S40 is affirmative, the process proceeds to step S42 where the initial value of the integral element of the proportional integral controller 70 is set as the command value of the maximum torque per ampere control (the command current idr1 set by the command current setting section 52) at this switching.

If the determination result at step S40 is negative, the process proceeds to step S44 to determine whether or not it is time to switch from the field weakening control mode to the maximum torque per ampere control mode. If the determination result at step S44 is affirmative, the process proceeds to step S46 to set the initial value of the proportional element of the proportional integral controller 70 to 0, and gradually decrease the gain Ki of the integral element to 0. As a result, the output of the proportional element of the proportional integral controller 70 gradually changes to 0 with the switching to the maximum torque per ampere control mode. At subsequent step S48, the process waits until the condition that the absolute value of the output of the integral element becomes smaller than the absolute value of the command current idr1 set by the command current setting section 52 is satisfied. When the condition is satisfied, the process proceeds to step S49 where the command current idr1 set by the command current setting section 52 is set as the d-axis command current idr.

When step 942 or step S49 is completed, or if the determination result at step S44 is negative, the process is terminated.

According to the sixteenth embodiment described above, other than the above advantages (1) to (7) provided by the first embodiment, the following advantage can be obtained.

(16) The command value of each controlled variable (each input parameter of the evaluation function J) of the motor-generator 10 in the field weakening control is set independently of the command values of the controlled variables in the maximum torque per ampere control. This makes it possible to prevent interference between the command values of both of these controls.

(17) The initial value of the integral element is set in accordance with the command value in the maximum torque per ampere control at the time of switching to the field weakening control. This makes it possible to maintain continuity of the command value.

(18) The command value of each controlled variable of the motor-generator 10 is changed gradually from the one corresponding to the field weakening control to the one corresponding to the maximum torque per ampere control at time of switching from the field weakening control to the maximum torque per ampere control. This makes it possible to maintain continuity of the command value.

Seventeenth Embodiment

Next, a seventeenth embodiment of the invention is described with particular emphasis on the difference with the first embodiment.

In each of the above embodiments, the present command value of each controlled variable in the field weakening control is calculated on the basis of the previous average value of magnitude of the output voltage of the inverter IV. Unlike to this, in this embodiment, the present command value is set on the basis of the average value predicted assuming that the present operating state is maintained as it is.

Figure 22:
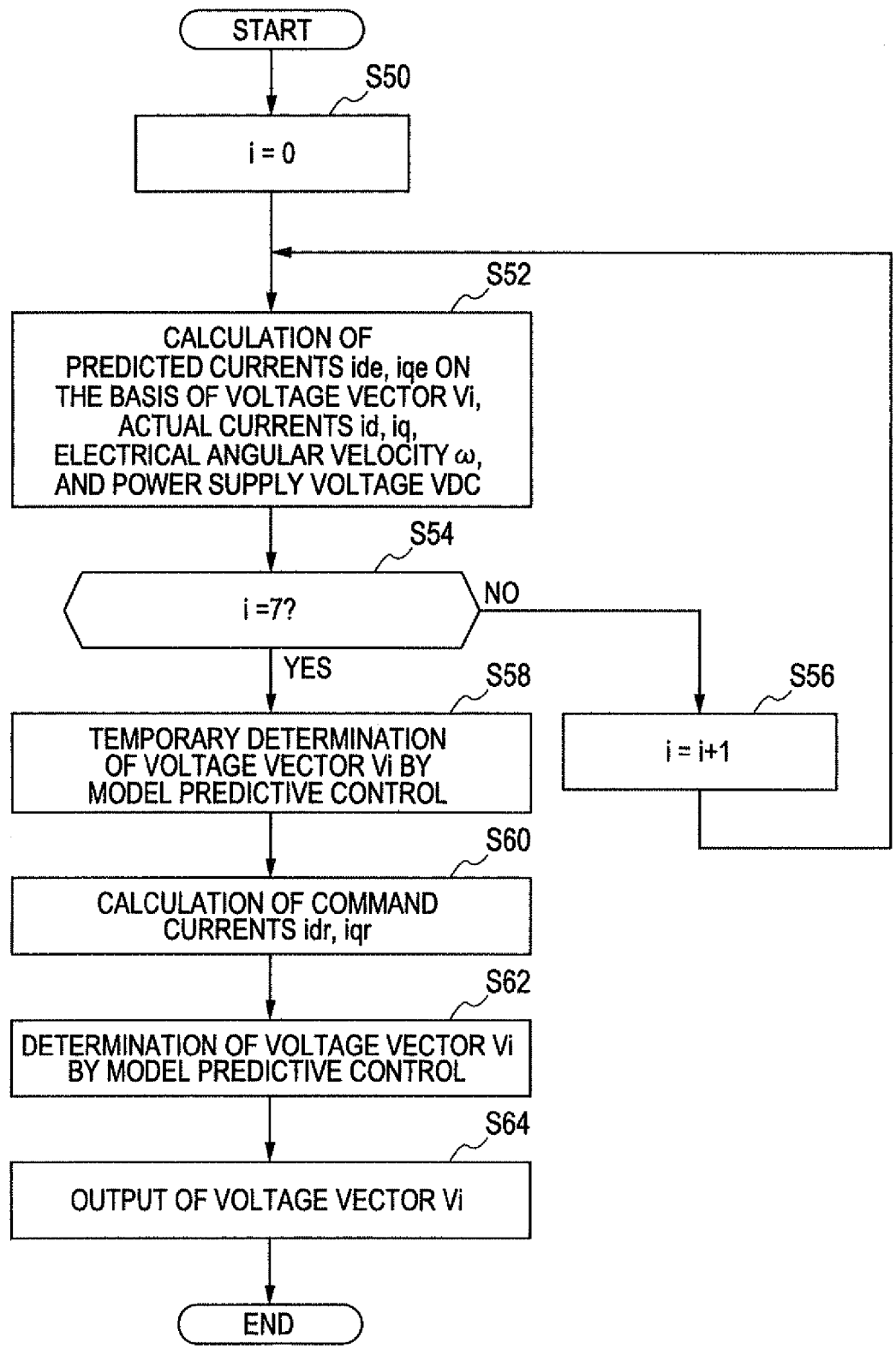
FIG. 22 is a flowchart showing the command value setting process performed by a control apparatus according to a seventeenth embodiment of the invention.

FIG. 22 shows the process to switch between the maximum torque per ampere control and the field weakening control. This process is performed repeatedly at regular time intervals by the control device 14.

This process begins by setting the parameter i to determine the voltage vector Vi to 0 at step S50. At subsequent step S52, the predicted currents ide and iqe are calculated on the basis of the voltage vector Vi, actual currents id and iq, electrical angular velocity ω and power supply voltage VDC. Step S52 is performed for each of the voltage vectors V0 to V7 through steps S54 and S56.

When the determination result at step S54 becomes affirmative, that is, when the predicted current ide and iqe have been calculated for all of the voltage vectors V0 to V7, the process proceeds to step S58 where the voltage vector Vi is determined temporarily by the model predictive control. Subsequently, at step S60, the command currents idr and iqr are calculated on the basis of the predicted currents ide and iqe which are predicted to flow through the motor-generator 10 in accordance with the temporarily determined voltage vector Vi.

At subsequent step S62, the evaluation function J determines the voltage vector Vi on the basis of the command currents idr and iqr calculated at step S60 and the predicted currents ide and iqe calculated at step S52. Finally, at step S64, the voltage vector Vi is outputted.

Eighteenth Embodiment

Next, an eighteenth embodiment of the invention is described with particular emphasis on the difference with the first embodiment.

Figure 23:
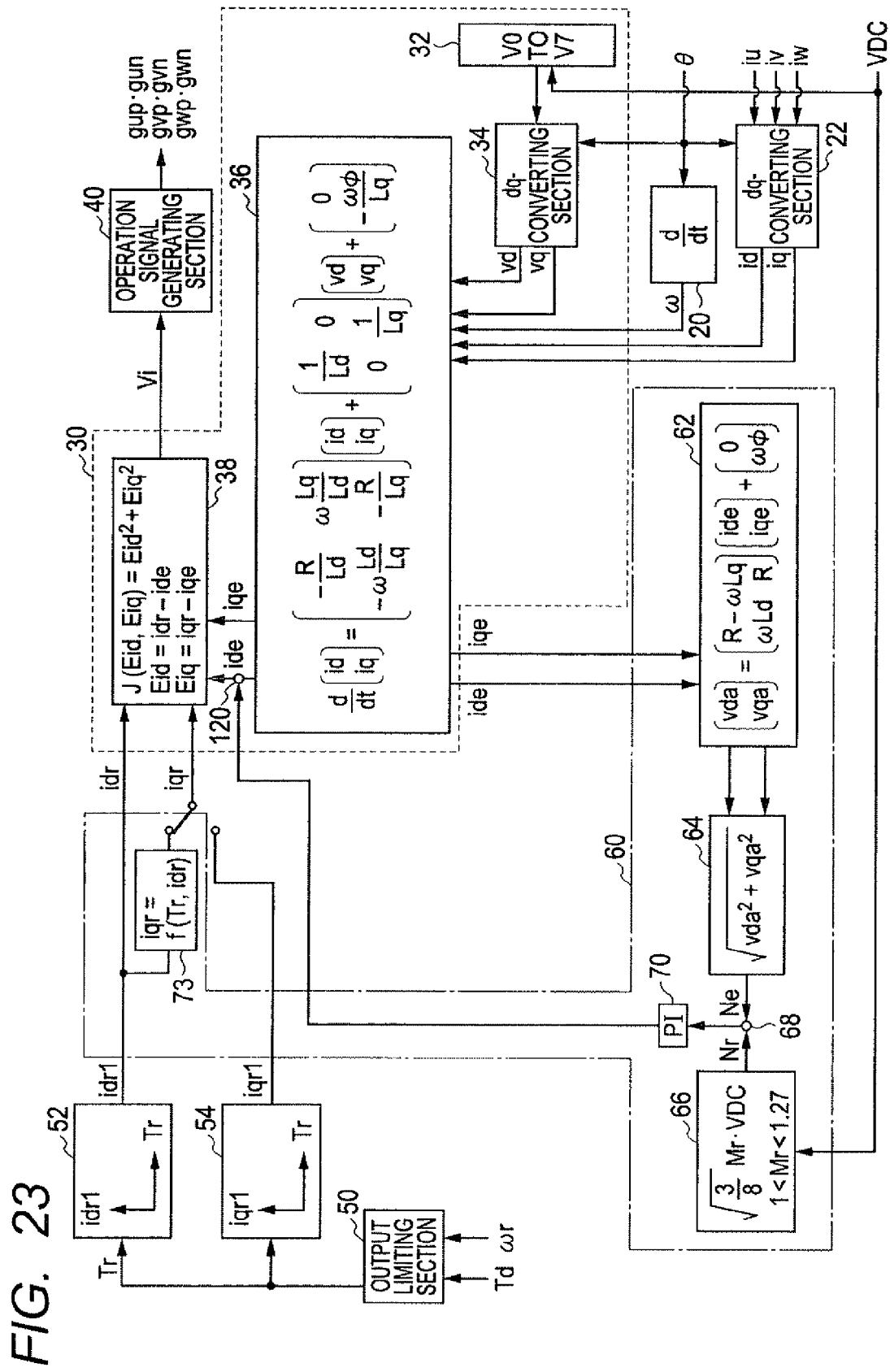
FIG. 23 is a functional block diagram explaining the operation of a control apparatus according to an eighteenth embodiment of the invention.

FIG. 23 is a functional block diagram explaining the process of model predictive control performed in this embodiment. In FIG. 23, the same reference numerals or characters identical to those shown in FIG. 3 represent the same components.

As shown in FIG. 23, in this embodiment, the predicted current ide is set as the manipulation object to feedback-control the average value of magnitude of the output voltage of the inverter IV at the target value. Accordingly, this embodiment includes a correcting section 120 to correct the predicted current ide by the output of the proportional integral controller 70. When the output of the proportional integral controller 70 is used as an addition value at the correcting section 72 in the first embodiment, if the output of the proportional integral controller 70 is used as a subtraction value at the correcting section 120, the output of the evaluation function J can be the same for the first and second embodiments.

Nineteenth Embodiment

Next, a nineteenth embodiment of the invention is described with particular emphasis on the difference with the first embodiment.

Figure 24:
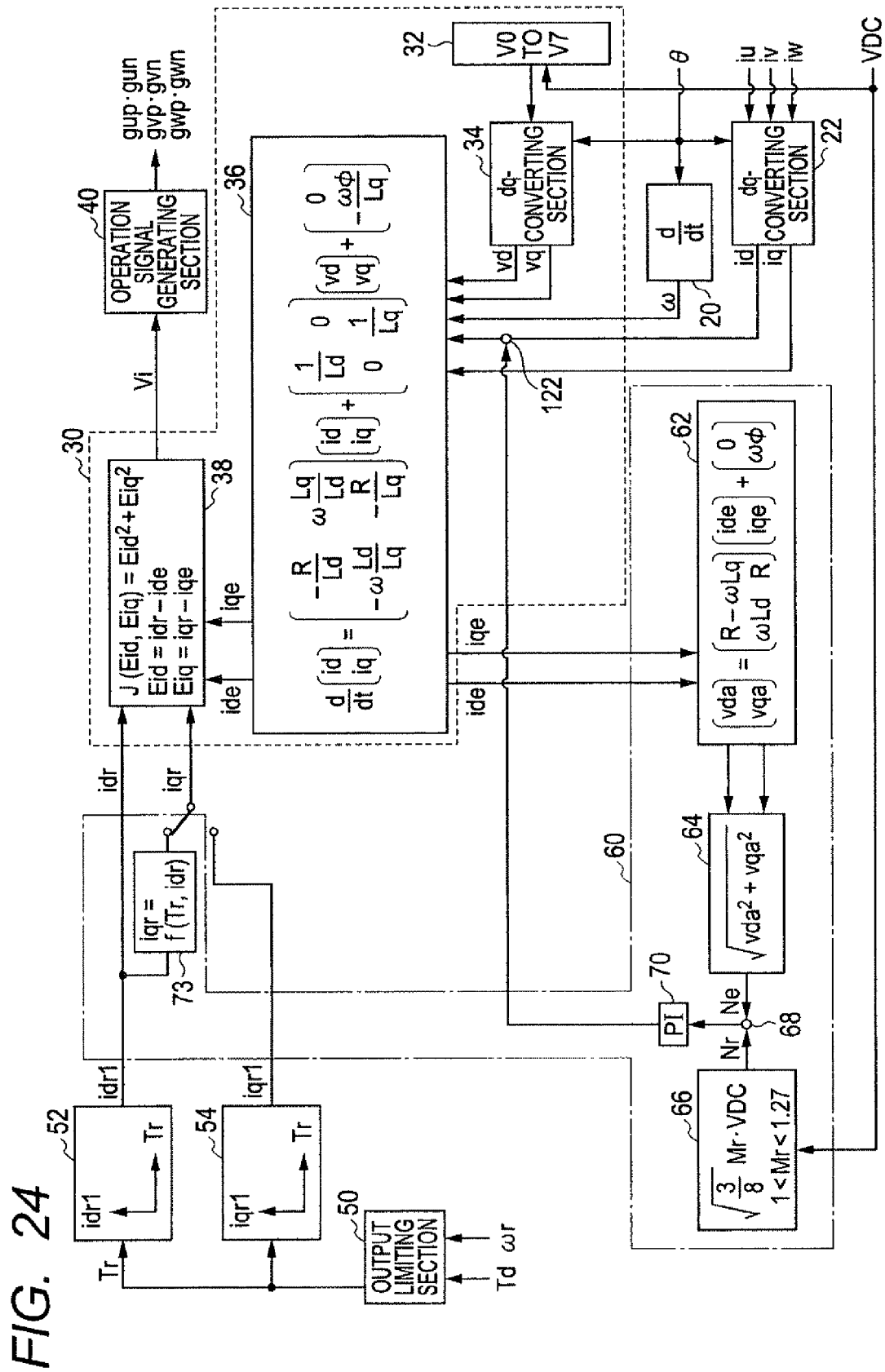
FIG. 24 is a functional block diagram explaining the operation of a control apparatus according to a nineteenth embodiment of the invention.

FIG. 24 is a functional block diagram explaining the process of model predictive control performed in this embodiment. In FIG. 24, the same reference numerals or characters identical to those shown in FIG. 3 represent the same components.

As shown in FIG. 24, in this embodiment, the actual current id inputted to the predicting section 36 is set as the manipulation object to feedback-control the average value of magnitude of the output voltage of the inverter IV at the target value. Accordingly, this embodiment includes a correcting section 122 to correct the actual current id by the output of the proportional integral controller 70. Also according to this embodiment, it is possible to indirectly manipulate the input parameters of the evaluation function J by the manipulated variable of the feedback control to control the magnitude of the output of the inverter IV at the target value.

Other Embodiments

It is a matter of course that various modifications can be made to the above embodiments as described below.

In the first to fourth embodiments, the d-axis command current idr is set as a direct manipulation object in the field weakening control mode, and the q-axis command current iqr is calculated from the torque command value Tr and the command current idr. However, the embodiments may be modified such that the q-axis command current iqr is set as a direct manipulation object, and the d-axis command current idr is calculated from the torque command value Tr and the command current iqr.

In the third embodiment, the same integral element is commonly used to calculate the manipulated variable to feedback-control the predicted value of the current at the command value, and to feedback-control the average value of magnitude of the output voltage of the inverter IV at the target value. However, different integral elements may be used for these feedback controls.

In the third embodiment, the manipulated variable to feedback-control the predicted value of the current at the command value is calculated by use of the proportional element and the integral element. However, it may be calculated by use of only the integral element, or by use of proportional, integral and differential elements.

In the fourth embodiment, the same integral element is commonly used to calculate the manipulated variable to feedback-control the predicted torque Te at the torque command value Tr, and to feedback-control the average value of magnitude of the output voltage of the inverter IV at the target value. However, different integral elements may be used for these feedback controls.

In the fourth embodiment, the manipulated variable to feedback-control the predicted torque Te at the torque command value Tr is calculated by use of the proportional element and the integral element. However, it may be calculated by use of only the integral element, or by use of proportional, integral and differential elements.

In the seventh embodiment, the same integral element is commonly used to calculate the manipulated variable to feedback-control the predicted value of the current at the command value, and to feedback-control the average value of magnitude of the output voltage of the inverter IV at the target value. However, different integral elements may be used for these feedback controls.

In the seventh embodiment, the manipulated variable to feedback-control the predicted value of the current at the command value is calculated by use of the proportional element and the integral element. However, it may be calculated by use of only the integral element, or by use of proportional, integral and differential elements.

In the eighth embodiment, the same integral element is commonly used to calculate the manipulated variable to feedback-control the predicted torque Te at the torque command value Tr, and to feedback-control the average value of magnitude of the output voltage of the inverter IV at the target value. However, different integral elements may be used for these feedback controls.

In the eighth embodiment, the manipulated variable to feedback-control the predicted torque Te at the torque command value Tr is calculated by use of the proportional element and the integral element. However, it may be calculated by use of only the integral element, or by use of proportional, integral and differential elements.

In the eleventh embodiment, the same integral element is commonly used to calculate the manipulated variable to feedback-control the predicted value of the current at the command value, and to feedback-control the average value of magnitude of the output voltage of the inverter IV at the target value. However, different integral elements may be used for these feedback controls.

In the eleventh embodiment, the manipulated variable to feedback-control the predicted value of the current at the command value is calculated by use of the proportional element and the integral element. However, it may be calculated by use of only the integral element, or by use of proportional, integral and differential elements.

In the twelfth embodiment, the same integral element is commonly used to calculate the manipulated variable to feedback-control the predicted torque Te at the torque command value Tr, and to feedback-control the average value of magnitude of the output voltage of the inverter IV at the target value. However, different integral elements may be used for these feedback controls.

In the twelfth embodiment, the manipulated variable to feedback-control the predicted torque Te at the torque command value Tr is calculated by use of the proportional element and the integral element. However, it may be calculated by use of only the integral element, or by use of only the proportional element or by use of proportional, integral and differential elements.

In the thirteenth embodiment, the field norm command value $\Phi fwc$ in the field weakening control is calculated on the basis of the actual currents id and iq. However, it may be calculated on the basis of one of the predicted currents ide and iqe, which corresponds to the voltage vector Vi determined to be used.

In the fourteenth embodiment, the field norm command value $\Phi fwc$ in the field weakening control is calculated on the basis of the command currents idr and iqr. However, it may be calculated on the basis of one of the predicted currents ide and iqe, which corresponds to the voltage vector Vi determined to be used. Further, it may be calculated on the basis of the actual currents id and iq.

In the thirteenth and fourteenth embodiments, the condition to switch to the flux norm command value $\Phi fwc$ in the field weakening control is that the flux norm command value $\Phi fwc$ is smaller than the flux norm command value $\Phi mt$ in the maximum torque per ampere control. However, the condition may be the same as the condition to start the feedback control to control the magnitude of the output voltage of the inverter IV at the target value. Conversely, in the thirteenth and fourteenth embodiments, the condition to start the feedback control to control the magnitude of the output voltage of the inverter IV at the target value may be made the same as the condition to switch to the flux norm command value $\Phi fwc$ in the field weakening control.

In the thirteenth and fourteenth embodiments, the field norm command value $\Phi r$ in the field weakening control may be the output of the proportional integral controller 70. In other words, the field weakening flux-norm-command-value setting section 112 may be omitted.

The means to lessen the variation of the command value of each controlled variable at the time of switching from the field weakening control to the maximum torque per ampere control is not limited to the one exemplified in the sixteenth embodiment. For example, it may be means for feedbacking, to the command value of each controlled variable in the maximum torque per ampere control, the parameter to set the integral element for the feedback control of magnitude of the output voltage of the inverter IV to the initial value.

The modification between the first embodiment and the sixteenth embodiment may be applied to the second to fifteenth embodiments. In this case, commonly using the same integral element to feedback-control each controlled variable of the motor-generator 10 at the command value, and to feedback-control the magnitude of the output voltage of the inverter IV at the target value makes it simple and easy to give the initial value to the integral element.

In the seventeenth embodiment, the present command value of each controlled variable is determined by the feedback control of the output voltage vector norm when the voltage vector Vi temporarily determined by the model predictive control is used. However, the actual command value may be determined based on the result obtained by performing such command value renewing operation by a plurality of times.

The modification between the first embodiment and the seventeenth embodiment may be applied to the second to sixteenth embodiments.

The modification between the first embodiment and the eighteenth embodiment may be applied to the second to seventeenth embodiments. Further, in these embodiments, although one of the command value and the predicted value of each controlled variable is corrected by the manipulated variable to feedback-control the average value of magnitude of the output voltage of the inverter IV at the target value, both of them may be corrected. In this case, by correcting each of them by a half of the value of the output of the proportional integral controller 70 respectively, the similar advantages as those provided by the first embodiment can be obtained.

The modification between the first embodiment and the nineteenth embodiment may be applied to the second to seventeenth embodiments.

Further, in each of the embodiments, although the average value of magnitude of the output voltage of the inverter IV is calculated by inputting the predicted currents ide and iqe to the average value calculating section 62, it may be calculated by inputting the actual currents id and iq to the average value calculating section 62.

The means to calculate the average value of magnitude of the output voltage of the inverter IV is not limited to the one that includes the average voltage calculating section 62. For example, it may be calculated by means which performs simple moving average process of the voltage vector Vi selected by the operating state determining section 38. However, in this case, it is necessary to make the sampling period of the voltage vector sufficiently shorter than the electrical angle period. Accordingly, the number of samplings may be variably set so as to decrease with the increase of the electrical angular velocity. Further, in view of the 60-degree symmetry in electrical angle of the motor structure, an average value for each electrical angle of 60 degrees may be calculated as the average voltage.

The means to feedback-control the magnitude of the output voltage of the inverter IV at the target value is not limited to the one that includes proportional and integral elements, or the one that includes only an integral element. The means may include proportional, integral and differential elements.

In each of the embodiments, the controlled variables are calculated for each of all the voltage vectors V0 to V7. However, the controlled variables may be calculated for each of the zero vectors V1 to V6, and one of the non-zero vectors V0 and V7.

The controlled variables as the input parameters of the evaluation function J are not limited to the ones described in the embodiments. For example, they may be the fluxes Φd and Φq on the dq-axes. Further, they may be one of the fluxes Φd and Φq on the dq-axes, and the torque. Further, they may be the flux Φd on the d-axis, and the current iq on the q-axis, or the flux Φq on the q-axis, and the current id on the d-axis.

The evaluation function J is not limited to the quantified deviation of magnitude of the output voltage vector of the inverter IV with respect to the target value, or the quantified deviation of the command value of the controlled variable with respect to the command value. For example, it may be tempered with the number of times that the operating state has been switched.

The means to adjust for the different units of the parameters inputted to the evaluation function J which are greatly different from each other in numerical value is not limited to the one which uses the weighting factors α and β. For example, the means may use the difference between the input parameters which have been normalized by the ratio to their maximums respectively instead of the difference in numerical value between the input parameters.

In each of the embodiments, each controlled variable at the next renewal timing (at the timing one control cycle ahead) determined by the operation of the inverter IV is predicted. However, the operating state of the inverter IV at the next renewing timing may be determined by sequentially predicting each controlled variable at the renewal timings up to several control cycles ahead.

The model used to predict the current is not limited to the one predicated on the fundamental wave. For example, a model including high order components with respect to the inductance or the induced voltage may be used as such a model. The means to predict the current may be the one that uses a map instead of the model equation. In this case, input parameters of the map may include the voltage (vd, vq), the electrical angular velocity ω, and further the temperature. Here, the map means a storage means to store the values of the output parameters corresponding to the discrete values of the input parameters.

The means to predict the torque is not limited to the one described in the above embodiments. For example, the torque may be predicted by use of a map which is supplied with the predicted currents ide and iqe.

In each of the embodiments, the final controlled variable of the rotating machine (the controlled variable which is required to have the desired value irrespective of whether it is a prediction object or not) is the torque. However, it may be the rotational speed of the rotating machine.

In each of the embodiments, the target value is set to the average value of magnitude of the output voltage of the inverter IV when the modulation index is at the predetermined value larger than 1, and the input parameters of the evaluation function J is manipulated by the feedforward control to attain the target value. However, the target value may be set to the average value of magnitude of the output voltage of the inverter IV when the modulation index is smaller than 1, for example, at 0.9.

The model to predict the current is not limited to the one which neglects iron loss. A model which takes account of iron loss may be used as such a model.

The rotating machine is not limited to an IPMSM (Interior Permanent Magnet Synchronous Motor). For example, the rotating machine may be a surface permanent magnet synchronous machine, or a field winding synchronous machine. Further, the rotating machine is not limited to the synchronous rotating machine. For example, it may be an induction rotating machine such as an induction motor.

The rotating machine is not limited to the one mounted on a hybrid vehicle, and may be the one mounted on an electric vehicle. Further, the rotating machine is not limited to the one used as a main engine of a vehicle.

The DC power supply is not limited to the converter CV. For example, it may be the high voltage battery 12. In other words, the converter CV may be deleted from the structure shown in FIG. 1.

The power converter circuit is not limited to the inverter IV. For example, it may be the one which can apply a three-stage voltage to each of the terminals of the rotating machine. Also in this case, it is advantageous to perform the field weakening control as described in the above embodiments in the range where the modulation index exceeds 1 when the difference between the maximum and minimum of the voltage is used as the voltage of the DC power supply. Also, when only a part of the voltage is used intentionally, it is advantageous to perform the field weakening control in the range where the modulation index exceeds 1 when the difference between the maximum and minimum of the voltage is used as the voltage of the DC power supply.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for an electric rotating machine to control at least one controlled variable of the electric rotating machine by manipulating an output voltage of a power converter circuit including switching elements operated at a set modulation index to connect positive and negative terminals of a DC power source to corresponding terminals of the electric rotating machine, the control apparatus comprising:
a prediction section configured to predict the controlled variable of the electric rotating machine for each of a plurality of cases where the power converter circuit is set in a corresponding one of a plurality of predetermined operating states;
a manipulation section configured to determine one of the predetermined operating states depending on a result of evaluation by an evaluation function which receives the predicted controlled variable and a command value of the controlled variable as input parameters thereof, and to set the converter circuit to the determined operating state; and
a feedback control section configured to feedback-control an average value of magnitude of the output voltage of the power converter circuit at a target value set in accordance with a voltage of the DC power source by manipulating the input parameters of the evaluation function depending on the average value of magnitude of the output voltage of the power converter circuit.

2. The control apparatus for an electric rotating machine according to claim 1, wherein the target value corresponds to the average value of magnitude of the output voltage when the modulation index is set to a value larger than 1.

3. The control apparatus for an electric rotating machine according to claim 1, wherein the target value is set such that an average amplitude between output lines of the power converter circuit becomes larger than the voltage of the DC power source.

4. The control apparatus for an electric rotating machine according to claim 1, wherein the target value is the average value of magnitude of the output voltage when the modulation index is set to a value smaller than a value of a modulation index to perform rectangular wave control.

5. The control apparatus for an electric rotating machine according to claim 1, wherein the feedback control section is started to operate when the modulation index reaches a predetermined value larger than 1.

6. The control apparatus for an electric rotating machine according to claim 1, wherein the feedback control section is activated when the average amplitude between output lines of the power converter circuit is larger than the voltage of the DC power source.

7. The control apparatus for an electric rotating machine according to claim 1, wherein the feedback control section feedback-controls the average value of magnitude of the output voltage of the power converter circuit at the target value by manipulating at least one of the predicted controlled variable and the command value inputted to the evaluation function as the input parameters.

8. The control apparatus for an electric rotating machine according to claim 7, wherein the controlled variable includes one of a d-axis current and a q-axis current and torque of the electric rotating machine, and the feedback control section manipulates one of the d-axis current and the q-axis current as the input parameters.

9. The control apparatus for an electric rotating machine according to claim 8, further comprising a sub-feedback control section configured to manipulate one of the d-axis current and the q-axis current as the input parameters in order to feedback-control a current flowing through the electric rotating machine at a command value.

10. The control apparatus for an electric rotating machine according to claim 8, further comprising a sub-feedback control section configured to manipulate one of the d-axis current and the q-axis current as the input parameters in order to feedback-control torque of the electric rotating machine at a command torque.

11. The control apparatus for an electric rotating machine according to claim 7, wherein the controlled variable includes torque and flux linkage of the electric rotating machine, and the feedback control section manipulates magnitude of the flux linkage.

12. The control apparatus for an electric rotating machine according to claim 7, wherein the controlled variable includes a current on dq-axes of the electric rotating machine as the input parameter of the evaluation function, and the feedback control section includes means for manipulating a command value of magnitude of flux linkage of the electric rotating machine, and means for setting a command value of the current on the dq-axes in accordance with magnitude of the manipulated flux linkage and command torque of the electric rotating machine.

13. The control apparatus for an electric rotating machine according to claim 11, further comprising a feedforward control section configured to set, as a command value of magnitude of the flux linkage, the magnitude of the flux linkage to make the an average value of magnitude of the output voltage of the power converter circuit on the basis of the voltage of the DC power source, electrical angular velocity of the electric rotating machine, and a current flowing through the electric rotating machine inputted thereto.

14. The control apparatus for an electric rotating machine according to claim 13, further comprising a maximum torque per ampere control section which calculates a command value of the flux linkage in order to generate maximum torque maintaining a current flowing through the electric rotating machine at a minimum, the feedforward control section is activated when the flux linkage is commanded to have a value smaller than the command value calculated by the maximum torque per ampere control section.

15. The control apparatus for an electric rotating machine according to claim 1, wherein the controlled variable is a current on dq-axes of the electric rotating machine, and the feedback control section manipulates one of a d-axis current and a q-axis current.

16. The control apparatus for an electric rotating machine according to claim 15, wherein the control apparatus indirectly controls torque of the electric rotating machine at a command torque by setting the current on the dq-axes as the controlled variable, and further comprises a setting section configured to set one of a command value of one of the d-axis current and the q-axis current which is not set as a manipulation object on the basis of the command torque and a command value of the other of the d-axis current and the q-axis current which is set as a manipulation object.

17. The control apparatus for an electric rotating machine according to claim 15, further comprising a sub-feedback control section configured to manipulate at least one of the d-axis current and the q-axis current as the input parameters in order to feedback-control a current flowing through the electric rotating machine at a command value.

18. The control apparatus for an electric rotating machine according to claim 15, further comprising a sub-feedback control section configured to manipulate at least one of the d-axis current and the q-axis current as the input parameters in order to feedback-control torque of the electric rotating machine at the command torque.

19. The control apparatus for an electric rotating machine according to claim 1, wherein the feedback control section is implemented by supplying, as the input parameters, the evaluation function with the predicted controlled variable, the command value of the controlled variable plus the target value set in accordance with the average value of magnitude of the output voltage of the converter circuit and the voltage of the DC power source.

20. The control apparatus for an electric rotating machine according to claim 1, further comprising a calculation section to calculate the average value of magnitude of the output voltage of the power converter circuit by use of a model equation of the electric rotating machine which receives a current flowing through the electric rotating machine and does not perform any differential operation processing on the received current.

* * * * *